(12) United States Patent
Kumar

(10) Patent No.: US 11,352,901 B2
(45) Date of Patent: Jun. 7, 2022

(54) METHODS AND APPARATUS TO DETERMINE MATERIAL PARAMETERS OF TURBINE ROTORS

(71) Applicant: Emerson Process Management Power and Water Solutions, Inc., Pittsburgh, PA (US)

(72) Inventor: Walesh Kumar, Noida (IN)

(73) Assignee: EMERSON PROCESS MANAGEMENT POWER & WATER SOLUTIONS, Pittsburgh, PA (US)

(*) Notice: Subject to any disclaimer, the term of this patent is extended or adjusted under 35 U.S.C. 154(b) by 300 days.

(21) Appl. No.: 16/792,718

(22) Filed: Feb. 17, 2020

(65) Prior Publication Data

US 2021/0254492 A1   Aug. 19, 2021

(51) Int. Cl.
| | |
|---|---|
| *F01D 21/00* | (2006.01) |
| *F01D 17/02* | (2006.01) |
| *G01N 25/16* | (2006.01) |
| *F01K 13/02* | (2006.01) |
| *G01N 25/00* | (2006.01) |
| *G01N 9/00* | (2006.01) |
| *G01N 25/18* | (2006.01) |

(Continued)

(52) U.S. Cl.
CPC ............. *F01D 21/003* (2013.01); *F01D 5/28* (2013.01); *F01D 17/02* (2013.01); *F01D 21/12* (2013.01); *F01D 21/14* (2013.01); *F01K 13/02* (2013.01); *G01N 9/00* (2013.01); *G01N 25/005* (2013.01); *G01N 25/16* (2013.01); *G01N 25/18* (2013.01); *F05D 2220/31* (2013.01); *F05D 2260/80* (2013.01); *F05D 2260/81* (2013.01); *F05D 2260/821* (2013.01); *F05D 2270/3032* (2013.01); *G01N 2203/0057* (2013.01)

(58) Field of Classification Search
CPC ...................................................... F01K 13/02
See application file for complete search history.

(56) References Cited

U.S. PATENT DOCUMENTS

| | | | | | |
|---|---|---|---|---|---|
| 4,029,951 | A | * | 6/1977 | Berry ...................... | F01D 19/02 290/40 R |
| 4,121,424 | A | * | 10/1978 | Sato ........................ | F01K 13/02 60/660 |

(Continued)

*Primary Examiner* — Laert Dounis
(74) *Attorney, Agent, or Firm* — Hanley, Flight & Zimmerman, LLC

(57) ABSTRACT

Methods and apparatus are disclosed to determine material parameters of a turbine rotor. An example apparatus includes a rotor geometry determiner to determine a geometry of the rotor, a node radius calculator to calculate radial node locations of radial nodes including a first radial node, a thermocouple interface to record first temperature values over an interval, a first thermal stress calculator to calculate first thermal stress values at one or more of the radial nodes over the interval, a node temperature calculator to calculate second temperature values at respective internal nodes of the first radial node, a reference value lookup to lookup first material parameter information, a second thermal stress calculator to determine second thermal stress values, a thermal stress comparator to calculate a difference between the thermal stress values, and, in response to the difference not satisfying a threshold, a material parameter adjuster to determine material parameters.

21 Claims, 14 Drawing Sheets

(51) Int. Cl.
*F01D 21/12* (2006.01)
*F01D 21/14* (2006.01)
*F01D 5/28* (2006.01)

(56) References Cited

U.S. PATENT DOCUMENTS

| | | | | | |
|---|---|---|---|---|---|
| 4,228,359 | A | * | 10/1980 | Matsumoto | F01D 19/02 290/40 R |
| 8,224,617 | B2 | * | 7/2012 | Kim | G06F 30/23 702/136 |
| 10,267,182 | B2 | * | 4/2019 | Cheng | F01K 13/02 |
| 2005/0085949 | A1 | * | 4/2005 | Kirchhof | F01K 7/165 60/660 |
| 2012/0095701 | A1 | * | 4/2012 | Julian | G07C 3/00 702/34 |
| 2014/0290249 | A1 | * | 10/2014 | Yashiki | F01K 7/165 60/657 |
| 2015/0121872 | A1 | * | 5/2015 | Yashiki | F01K 7/165 60/660 |
| 2015/0121874 | A1 | * | 5/2015 | Yoshida | F01D 19/02 60/660 |

* cited by examiner

METHODS AND APPARATUS TO DETERMINE MATERIAL PARAMETERS OF TURBINE ROTORS

FIELD OF THE DISCLOSURE

This disclosure relates generally to turbine rotors and, more particularly, to methods and apparatus to determine material parameters of turbine rotors.

BACKGROUND

Process control systems associated with turbines, such as steam turbines used for industrial power generation, often control start-up, intermediate operation, and shutdown procedures of the turbines. Such turbines can experience various mechanical and thermal stresses during operation that may damage the turbines. Prognostic health monitoring may be desirable to analyze turbine operation.

BRIEF DESCRIPTION OF THE DRAWINGS

The figures are not to scale. In general, the same reference numbers will be used throughout the drawing(s) and accompanying written description to refer to the same or like parts.

Figure 1A:
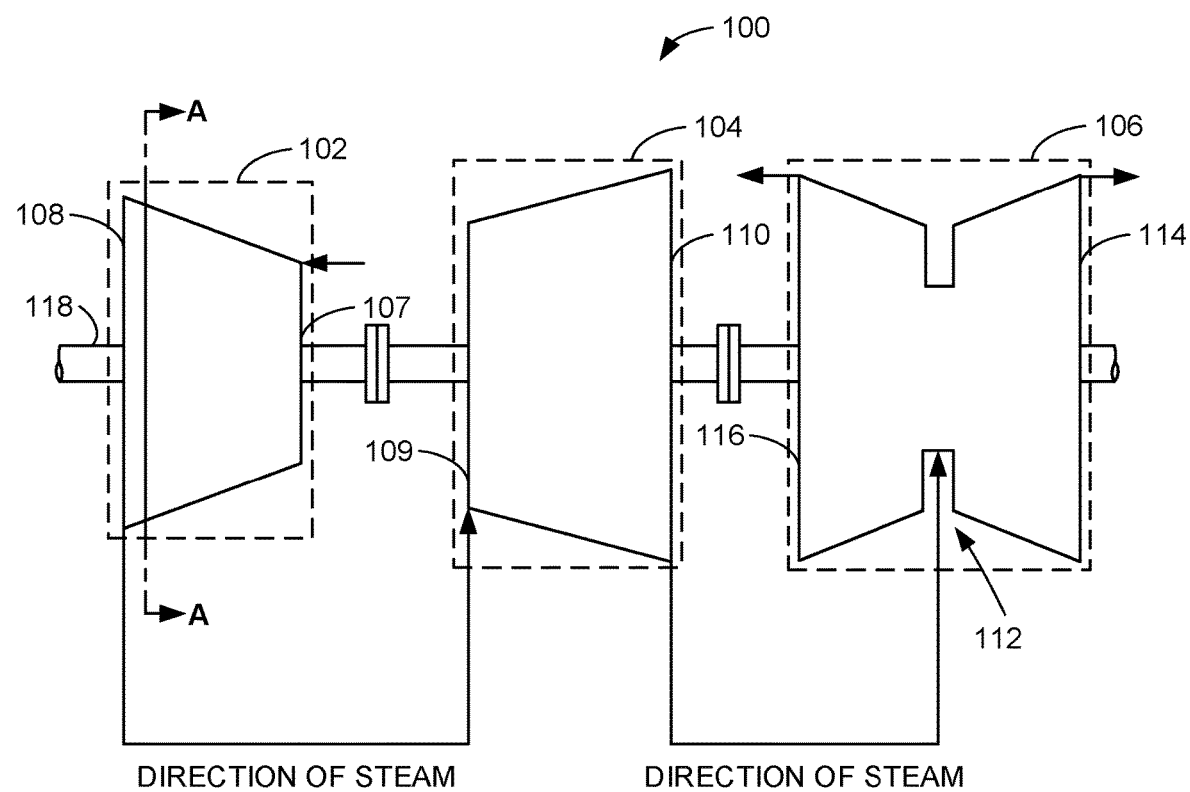
FIG. 1A is a side view of an example turbine that can be implemented in accordance with the teachings of this disclosure.

Descriptors "first," "second," "third," etc., are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

A turbine in a power generation system can experience significant temperature differentials. For instance, a rotor of the turbine can experience widely varying temperature differentials throughout the rotor due to startup and/or shutdown procedures for the turbine. In some instances, if temperature differentials are not moderated, resulting thermal stresses can increase creep, fatigue, and/or deformation of the rotor and a shaft to which it is coupled. The thermal stresses can severely decrease a life of operation of the rotor, the shaft, and/or, more generally, the turbine. For example, the thermal stresses may cause eccentricities and/or deformation of the rotor and shaft (e.g., shaft run-out) and, thus, lead to destructive vibrations that may cause one or more failures associated with the turbine. In such examples, an eccentricity can correspond to a rotation of the shaft offset relative to a central axis.

Typically, rotor thermal stresses of a turbine are measured using a thermal stress monitoring tool supplied with the turbine by the original equipment manufacturer (OEM) (e.g., an OEM thermal stress calculator) of the turbine. However, such OEM thermal stress monitoring tools are typically incompatible with a process control system in which the turbine is deployed because the OEM thermal stress monitoring tools are unable to efficiently communicate with the process control system. For example, a process control system monitoring a turbine may obtain only a portion of data or an output in an incompatible format from the OEM thermal stress monitoring tool. In such examples, the process control system may be unable to generate automated alerts associated with the turbine to a plant operator or administrator based on the incomplete data or incompatibly formatted data. Accordingly, plant operators may not rely on thermal stress calculations by the OEM thermal stress monitoring tool to initiate startup and/or shutdown procedures and, in some instances, may disregard data from the OEM thermal stress monitoring tool.

Process control systems can perform thermal stress calculations or other determinations associated with a turbine rotor by relying on material and/or temperature dependent parameters, such as the thermal diffusivity ($\alpha$), Young's modulus (E), coefficient of thermal expansion ($\alpha_{CTE}$), thermal conductivity (k), specific heat capacity ($c_p$), density and Poisson's ratio (v) associated with the turbine rotor. For example, some material parameters such as density can be material dependent but not significantly temperature dependent. Thus, the examples disclosed herein provide an improved method for determining the aforementioned material parameters and/or material parameter information (e.g., thermal diffusivity, Young's modulus, coefficient of thermal expansion, thermal conductivity, specific heat capacity, density, Poisson' ratio, etc.) in connection with a turbine rotor associated with a process control system of interest.

Examples disclosed herein determine material parameters of turbine rotors. In some disclosed examples, a turbine measurement controller obtains measurements associated with a rotor of a turbine. For example, the turbine measurement controller can obtain temperature readings corresponding to positions internal to the turbine, geometric properties (e.g., radius, diameter, etc.) of the rotor, thermal stress results from an OEM thermal stress tool, a material composition (e.g., a chemical composition) of the rotor, etc., and/or a combination thereof. In some disclosed examples, a turbine parameter determiner obtains the measurements and queries reference values, calculates thermal stress of the rotor, compares the calculated thermal stress to thermal stress results generated by an OEM thermal stress calculator, and/or adjusts material parameter and/or material parameter information estimations based on the comparison. For example, the turbine parameter determiner can determine, with improved accuracy, turbine parameters such as material parameters (e.g., thermal diffusivity, Young's modulus, coefficient of thermal expansion, thermal conductivity, specific heat capacity, density, Poisson' ratio, etc.) of the rotor.

In some disclosed examples, the turbine parameter determiner transmits parameters to the turbine measurement controller, and, by way of the turbine measurement controller, a turbine drive controller and associated aspects to monitor thermal stresses of the turbine in real-time, execute and/or monitor startup and/or shutdown conditions, and/or provide notifications to turbine operators to facilitate control of the turbine. Advantageously, the example turbine measurement controller and/or turbine drive controller can improve operation of the turbine by executing an appropriate startup/shutdown procedure with increased speed, providing automated notifications of excess thermal stresses to a turbine operator, and/or otherwise facilitating an automated action based on thermal stress calculations.

FIG. 1A is a front view of an example turbine 100 that can be implemented in accordance with the teachings of this disclosure. In the illustrated example of FIG. 1A, the turbine 100 is an impulse turbine driven by steam (e.g., a steam turbine). In other examples, the turbine 100 can be a reaction turbine, a gas turbine, and/or any other suitable machinery.

The turbine 100 of FIG. 1A is a multi-stage turbine including an example high pressure stage 102, an example intermediate pressure stage 104, and an example low pressure stage 106. In FIG. 1A, the steam can have a first pressure and a first temperature when entering the high pressure stage 102. The steam can have a second pressure less than the first pressure and a second temperature less than the first temperature when entering the intermediate pressure stage 104. In FIG. 1A, the steam can have a third pressure less than the second pressure and a third temperature less than the second temperature when entering the low pressure stage 106. For example, the steam can enter the high pressure stage 102 in a superheated state and exit the low pressure stage 106 either superheated to a lesser degree or at a quality (e.g., x) equal to or less than 1 (e.g., x<1, a mixture of condensed liquid water and steam, etc.).

In some examples, steam entering the turbine 100 can be produced in a boiler (e.g., a fire-tube boiler, a water-tube boiler, etc.), a nuclear reactor (e.g., a boiling water reactor, a pressurized water reactor, etc.), or any other suitable means for producing steam. In some examples, any suitable working fluid other than water (e.g., steam) can be used. The high pressure stage 102 and the intermediate pressure stage 104 of FIG. 1A are both single flow stages (e.g., steam moves in one direction through a respective stage) and the low pressure stage 106 is a double flow stage (e.g., steam enters in a center of the stage and exits through either end of the stage).

In the illustrated example of FIG. 1A, steam enters the high pressure stage 102 at an example high pressure inlet 107 and exits at an example high pressure outlet 108. In FIG. 1A, the steam exiting the high pressure outlet 108 moves to a reheating stage (not shown). After the reheating stage, the steam enters the intermediate pressure stage 104 at an example intermediate pressure inlet 109 and exits at an example intermediate pressure outlet 110. In some examples, steam can enter the high pressure stage 102 and the intermediate pressure stage 104 in parallel. In such examples, after steam exits the intermediate pressure stage 104, the steam can enter the low pressure stage 106 at an example low pressure inlet 112 and exit from a first example low pressure outlet 114 and a second example low pressure outlet 116. In some examples, the steam enters an inlet of a condenser (not shown) after exiting the low pressure stage 106. For example, the turbine 100 can be implemented based on a thermodynamic cycle such as the Rankine cycle.

In the illustrated example of FIG. 1A, the turbine 100 is coupled to and/or in whole or in part integral with an example shaft 118. Permanent or semi-permanent fixtures suspend the shaft 118 via bearings (e.g., journal bearings, rolling element bearings, etc.) (not shown). In FIG. 1A, the shaft 118 is operatively coupled to a generator (not shown) to generate electricity. The A-A line of FIG. 1A shows the orientation of the cross section of FIG. 1B.

Figure 1B:
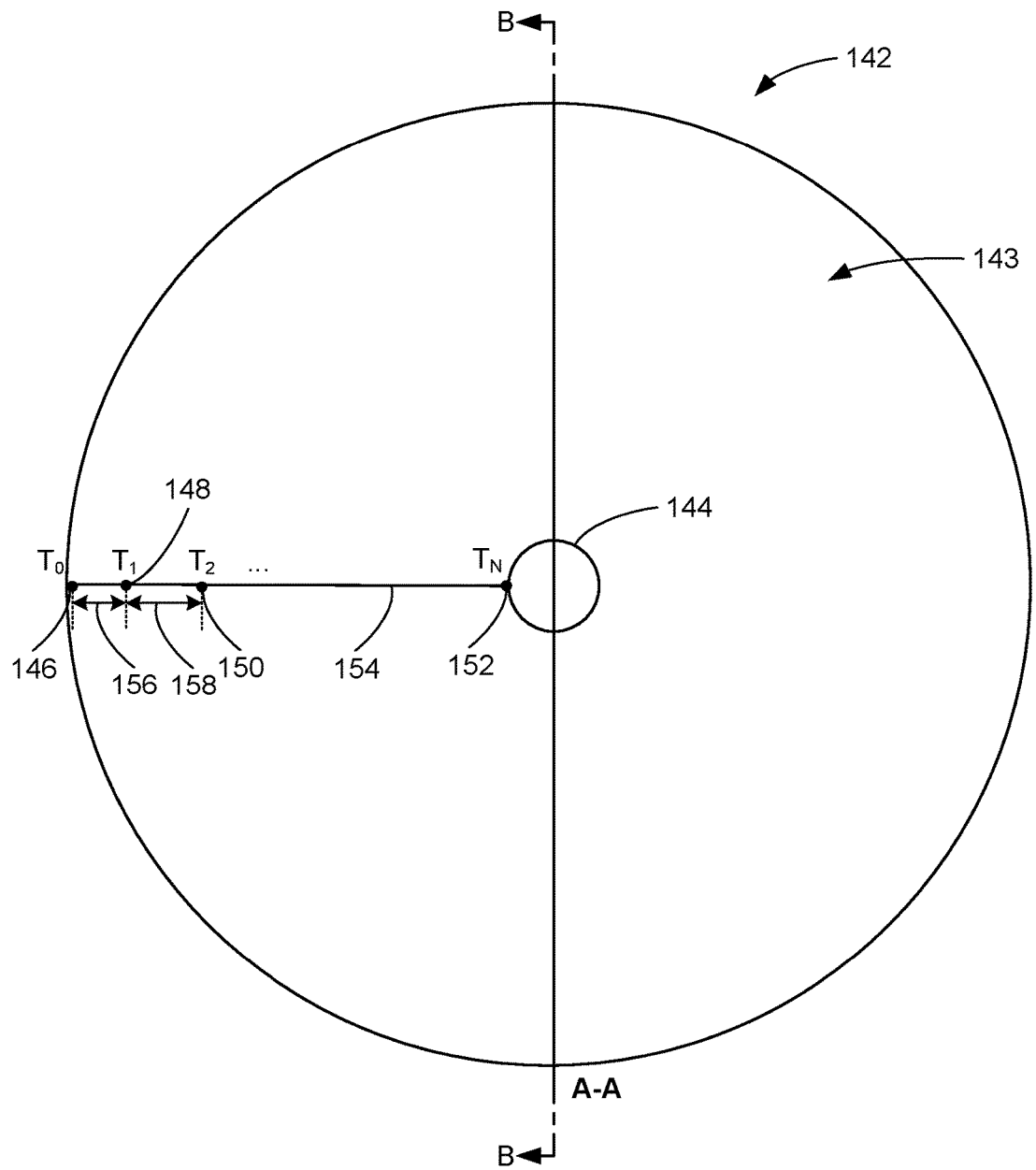
FIG. 1B is a front view of a turbine cross section taken axially along an A-A line of the example turbine of FIG. 1A including a high-pressure rotor and a shaft and otherwise shown without other moving or stationary parts.

FIG. 1B is a first example cross section 142 of the turbine 100 of FIG. 1A taken at the A-A line of the turbine 100. In FIG. 1B, the first cross section 142 depicts a simplified version of a rotor included in the high pressure stage 102 of the turbine 100. In FIG. 1B, the first example cross section 142 of the rotor of the turbine 100 is shown without blades and having a central bore 144. In other examples, the rotor does not have a central bore and instead includes an integral protruding shaft portion. In FIG. 1B, the rotor of the cross section 142 can include one or more blades (e.g., components of the rotor) coupled to the rotor via any suitable manner (e.g., via axial keys, via circumferential keys, etc.). In some examples, the rotor, the one or more blades of the rotor, and/or the shaft can be integral (e.g., continuous). For example, the rotor and the shaft can be integral, and the one or more blades can be coupled to the rotor. For example, the one or more blades and the rotor can be integral, and the rotor can be coupled to the shaft.

In the illustrated example of FIG. 1B, the first cross section 142 depicts an example reference node 146, a first example node 148, a second example node 150, and an Nth example node 152 located along an example radial line 154. In FIG. 1B, the nodes 146, 148, 150, 152 are representative nodes having no physical manifestation on the rotor and are identified for computational purposes. Similarly, the radial line 154 is representative and has no physical manifestation on the rotor. For example, the nodes 146, 148, 150, 152 of FIG. 1B can correspond to radial positions at which it can be desirable to estimate and/or otherwise determine temperature values. The nodes 146, 148, 150, 152 of FIG. 1B represent discrete radial locations and/or circular outlines to reduce complexity in executing heat transfer calculations. Additionally or alternatively, the first cross section 142 of FIG. 1B can include any number of nodes (e.g., any quantity N of nodes) spaced apart in any manner along the radial line 154.

In the illustrated example of FIG. 1B, the reference node 146 is an outermost node (e.g., the node furthest from a central bore 144 and/or a central axis of a rotor and/or shaft) of the nodes 146, 148, 150, 152 and is positioned and/or otherwise depicted on an outer surface of a rotor (e.g., at an outer tip of a blade of the rotor). In some examples, a turbine measurement controller (e.g., the turbine measurement controller 236 of FIGS. 2 and/or 3A) estimates a reference temperature $T_0$ at the reference node 146. For example, the reference temperature can be the temperature at the radially outer tip of a blade such as the first blade 232A. In such examples, a turbine parameter determiner (e.g., the turbine parameter determiner 240 of FIGS. 2 and/or 4) in communication with the turbine measurement controller can associate $T_0$ as the temperature of the steam at the high pressure inlet 107 to the high pressure stage 102, the intermediate pressure inlet 109 to the intermediate pressure stage 104, and/or the low pressure inlet 112 to the low pressure stage 106, etc. Alternatively, the turbine parameter determiner can estimate the temperature $T_0$ at the reference node 146 based on heat transfer properties (e.g., forced convection from steam).

In the example of FIG. 1B, the first node 148 is spaced a first example radial distance 156 from the reference node 146. Using example computational heat transfer models disclosed herein, the turbine parameter determiner can estimate a first temperature $T_1$ at the first node 148. In some examples, the turbine parameter determiner can estimate a second temperature $T_2$ at the second node 150 spaced a second example radial distance 158 from the first node 148. In some examples, the second radial distance 158 can be greater than the first radial distance 156. In other examples, the second radial distance 158 can be less than or equal to the first radial distance 156. In some examples, the turbine parameter determiner can estimate an Nth temperature $T_N$ at the Nth node 152. In FIG. 1B, the Nth node 152 is the innermost node and is positioned on and/or otherwise at the central bore 144. In other examples, such as an example where the rotor and the shaft are integral (e.g., FIG. 2), the Nth node 152 can be located at the central axis of the rotor and/or shaft and/or can be located at any convenient location on the rotor, the blades of the rotor, and/or shaft. Any number of temperatures at any number of intermediate nodes can be placed at subsequent distances radially inward from the second node 150 and radially outward from the Nth node 152 (e.g., a third temperature at a third node, a fourth temperature at a fourth node, an N-1th temperature at an N-1th node, etc.). For example, there can be 3, 10, 100, or any other number (e.g., N) radial nodes subsequent to the reference node 146.

In the illustrated example of FIG. 1B, the first cross section 142 depicts node placement within the high pressure stage 102 of FIG. 1A for the turbine parameter determiner to calculate node temperatures and calculate thermal stresses in the rotor of the high pressure stage 102. In some examples, the node placement, node temperature calculation, and thermal stress calculation as described in connection with the high pressure stage 102 can be applied accordingly to at least one of the intermediate pressure stage 104 and the low pressure stage 106 of FIG. 1A to calculate the thermal stresses in the rotors of intermediate pressure stage 104 and/or the low pressure stage 106 of the turbine 100. The B-B cut of FIG. 1B shows the orientation of the cross section of FIG. 2. The node placement, temperature calculation, and thermal stress calculation can be applied to any combination of the blades, the rotor, and/or the shaft.

Figure 2:
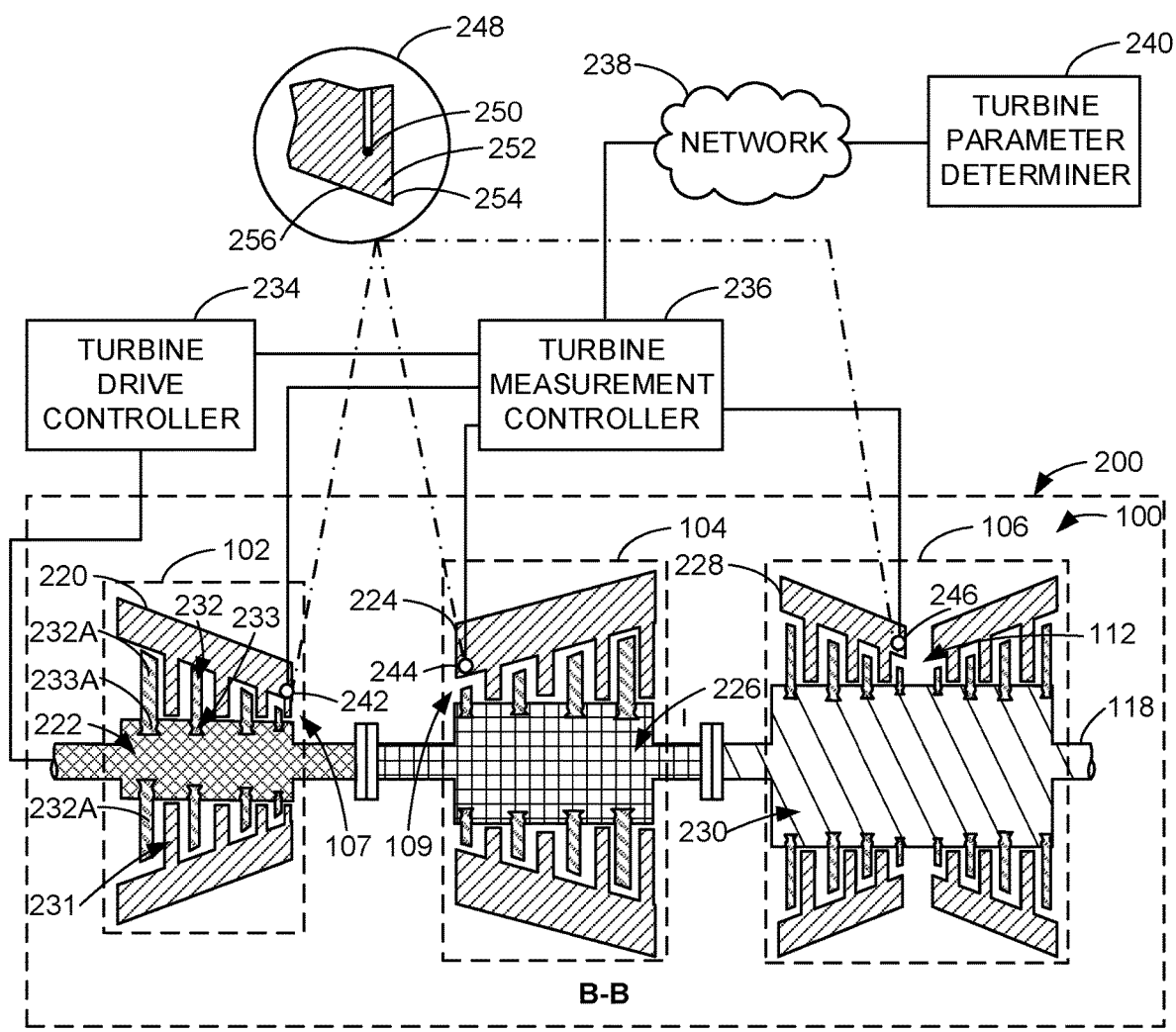
FIG. 2 depicts a cross section of the example turbine of FIGS. 1A and/or 1B taken radially into the page at the B-B line of the turbine of FIG. 1B, an example turbine drive controller, an example turbine measurement controller, and an example turbine parameter determiner.

FIG. 2 is a second example cross section 200 taken axially along the B-B line of the first cross section 142 of FIG. 1B. In FIG. 2, the high pressure stage 102 of the turbine 100 has a first example casing 220 housing a first example rotor 222. In FIG. 2, the intermediate pressure stage 104 of FIG. 1A has a second example casing 224 housing a second example rotor 226. In FIG. 2, the low pressure stage 106 of FIG. 1A has a third example casing 228 housing a third example rotor 230. In the example of FIG. 2, the first, second, and third casings 220, 224, 226 include one or more example guide vanes 231. In this example, the guide vanes 231 are integral with respective ones of the casings 220, 224, 226. In other examples, the guide vanes 231 can be coupled to respective ones of the casings 220, 224, 226 (e.g., via axial keys, via circumferential keys, etc.).

In the illustrated example of FIG. 2, each of the rotors 222, 226, 230 are integral parts. In the example of FIG. 2, the rotors 222, 226, 230 of each stage (e.g., the high pressure stage 102, the intermediate pressure stage 104, and the low pressure stage 106) are integral with the shaft 118. Accordingly, the shaft 118 is divided between portions integral with respective ones of the first, second, and third rotors 222, 226, 230. In other examples, the shaft 118 is integral with one or two of the rotors 222, 226, 230 and/or the rotors 222, 226, 230 are coupled to a generator in any suitable direct or indirect drive configuration.

In the illustrated example of FIG. 2, each of the rotors 222, 226, 230 includes fixed or moving blades (e.g., turbine blades) 232 such as a first example blade 232A of the first rotor 222. In the example of FIG. 2, the blades 232 are components of their respective rotor (e.g., one of the rotors 22, 226, 230). In some examples, the blades 232 are contoured and/or designed to reduce kinetic energy from steam moving across the blades 232 and, thus, produce a moment on the shaft 118 and/or the respective ones of the rotors 222, 226, 230. In such examples, the steam propagating through the turbine 100 can cause rotation of the shaft 118 and/or the respective ones of the rotors 222, 226, 230. In the example of FIG. 2, the blades 232 include respective circumferential keys 233 to, via axial and radial interference with respective circumferential grooves (e.g., slots) on their respective rotors such as the high-pressure rotor 222, restrict the respective ones of blades 232 from axial and radial movement relative to their rotors. In other examples, the keys 233 can be axial keys. In the example of FIG. 2, the first example blade 232A includes a first example key 233A.

In the illustrated example of FIG. 2, the turbine 100 is communicatively coupled to an example turbine drive controller 234. In FIG. 2, the turbine drive controller 234 can be implemented by a logic circuit such as, for example, a hardware processor. However, any other type of circuitry can additionally or alternatively be used such as, for example, one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)).

In some examples, the turbine drive controller 234 is communicatively coupled to at least one of a boiler (not shown), a reheater (not shown), a condenser (not shown), a feedwater pump (not shown), or a generator (not shown), to execute, institute, and/or otherwise implement a desired thermodynamic cycle (e.g., the Rankine cycle). For example, the turbine drive controller 234 can actuate, control, and/or otherwise invoke a boiler to generate a quantity of steam to cause a desired or specified rotational speed of the shaft 118 and/or, more generally, a desired power output associated with the turbine 100. In some examples, the turbine drive controller 234 is communicatively coupled to one or more governors (e.g., throttle governor(s), governing valve(s), bypass valve(s), etc.) (not shown). For example, the turbine drive controller 234 can actuate the governor(s) to control the rotational speed of the shaft 118 and/or the rotors 222, 226, 230 during startup and/or shutdown procedures, overload and/or underload conditions, etc., associated with the turbine 100.

In the illustrated example of FIG. 2, the turbine 100 is communicatively coupled to an example turbine measurement controller 236 via one or more of first, second, and third thermocouples 242, 244, 246. For example, the turbine measurement controller 236 can be physically coupled (e.g., directly coupled) to a respective one of the thermocouples 242, 244, 246 via one or more wired connections (e.g., a cable including one or more conductors, local area networks (LANs), etc.). In other examples, the turbine measurement controller 236 can be wirelessly coupled to a respective one of the thermocouples 242, 244, 246 via one or more wireless connections (e.g., a Bluetooth® connection, a Wi-Fi Direct connection, etc.). Additionally or alternatively, the turbine measurement controller 236 can be coupled to thermistor(s), infrared thermometer(s), and/or any other appropriate means for determining temperature.

In the illustrated example of FIG. 2, the turbine measurement controller 236 is coupled to (1) the one or more thermocouples 242, 244, 246 monitoring the turbine 100, (2) the turbine drive controller 234, (3) an example network 238, and (4) an example turbine parameter determiner 240 via the network 238. In some examples, the turbine measurement controller 236 collects, measures, and/or otherwise obtains temperature readings, OEM thermal stress readings, rotor geometry, etc., associated with the turbine 100.

In the illustrated example of FIG. 2, the thermocouples 242, 244, 246 are resistance temperature detectors (RTDs). Alternatively, one or more of the thermocouples 242, 244, 246 can be a different type of thermocouple or other temperature sensing device or sensor. Although the turbine measurement controller 236 obtains measurements from the thermocouples 242, 244, 246 to estimate reference temperature values (e.g., the temperature at the reference node 146 of FIG. 1B), any other means can be used to measure and/or otherwise estimate reference temperature values.

In the illustrated example of FIG. 2, the first thermocouple 242 is coupled to a first surface at a first location of the high pressure stage 102. In FIG. 2, the first location corresponds to (e.g., is at or near) the high pressure inlet 107 of the high pressure stage 102. In FIG. 2, the second thermocouple 244 is coupled to a second surface at a second location of the intermediate pressure stage 104. In FIG. 2, the second location corresponds to the intermediate pressure inlet 109 of the intermediate pressure stage 104. In FIG. 2, the third thermocouple 246 is coupled to a third surface at a third location of the low pressure stage 106. In FIG. 2, the third location corresponds to the low pressure inlet 112 of the low pressure stage 106.

In the illustrated example of FIG. 2, an example enlarged portion 248 illustrates an example location of an example representative thermocouple 250 positioned within an example representative casing 252. In FIG. 2, the enlarged portion 248 represents the location of the first, second, and third thermocouples 242, 244, 246 (e.g., the representative thermocouple 250) relative to their respective casings 220, 224, 228 (e.g., the representative casing 252). In the enlarged portion 248 of FIG. 2, the representative thermocouple 250 is disposed within the representative casing 252 near an inlet of a turbine stage (e.g., one of the turbine stage inlets 107, 109, 112), displaced slightly from a first external face 254 and a second external face 256, the external faces 254, 256 located at the inlet.

In the illustrated example of FIG. 2, the turbine measurement controller 236 can determine the geometry of the turbine rotor(s) (e.g., through manual input, sensors, and/or lookup modules, etc.). For example, the turbine measurement controller 236 can determine the outer radius of a turbine rotor (e.g., the radius at the reference node 146 of FIG. 1B) and/or the radius at the bore 144 of a turbine rotor (e.g., the radius at the Nth node 152 of FIG. 1B).

In FIG. 2, the turbine measurement controller 236 can calculate, obtain, and/or otherwise receive the material composition (e.g., the chemical composition) of the rotors 222, 226, 230. In FIG. 2, the turbine measurement controller 236 can invoke the turbine drive controller 234 to actuate the turbine 100. In the example of FIG. 2, the turbine measurement controller 236 can calculate, obtain, and/or otherwise receive first thermal stress values (e.g., OEM thermal stress values from an OEM thermal stress calculator). In FIG. 2, the turbine measurement controller 236 can obtain thermocouple readings (e.g., readings from thermocouples 242, 244, 246).

In the illustrated example of FIG. 2, the turbine parameter determiner 240 can lookup reference values for temperature and material dependent parameters (e.g., Young's modulus, thermal diffusivity, Poisson's ratio, etc.). In FIG. 2, the turbine parameter determiner 240 can estimate, calculate, and/or otherwise determine the temperature at the radial nodes (e.g., the nodes 146, 148, 150, 152 of FIG. 1B) of the rotors 222, 226, 230 of the turbine 100. In FIG. 2, the turbine parameter determiner 240 can estimate, calculate, and/or otherwise determine an average temperature of one or more of the rotors 222, 226, 230. In FIG. 2, the turbine parameter determiner 240 can estimate, calculate, and/or otherwise determine thermal stress values based on determined temperature values and estimated material and temperature dependent parameters. In FIG. 2, the turbine parameter determiner 240 can calculate new (e.g., with increased accuracy) material and temperature dependent parameters and related information based on a comparison between OEM thermal stress values and calculated thermal stress values. For example, the turbine parameter determiner 240 can determine adjusted material parameters (e.g., thermal diffusivity, Young's modulus, coefficient of thermal expansion, Poisson's ratio, thermal conductivity, specific heat capacity, and/or density, etc.) by simulating steps in a time interval.

In the illustrated example of FIG. 2, the network 238 is a bus and/or a computer network. For example, the network 238 can be a process control network corresponding to one or more wired or wireless connections. In some examples, the network 238 is a network with the capability of being communicatively coupled to the Internet. However, the network 238 can be implemented using any suitable wired and/or wireless network(s) including, for example, one or more data buses, one or more LANs, one or more wireless LANs, one or more cellular networks, one or more fiber optic networks, one or more satellite networks, one or more private networks, one or more public networks, etc. In FIG. 2, the network 238 enables the turbine measurement controller 236 to be in communication with the turbine parameter determiner 240.

Figure 3A:
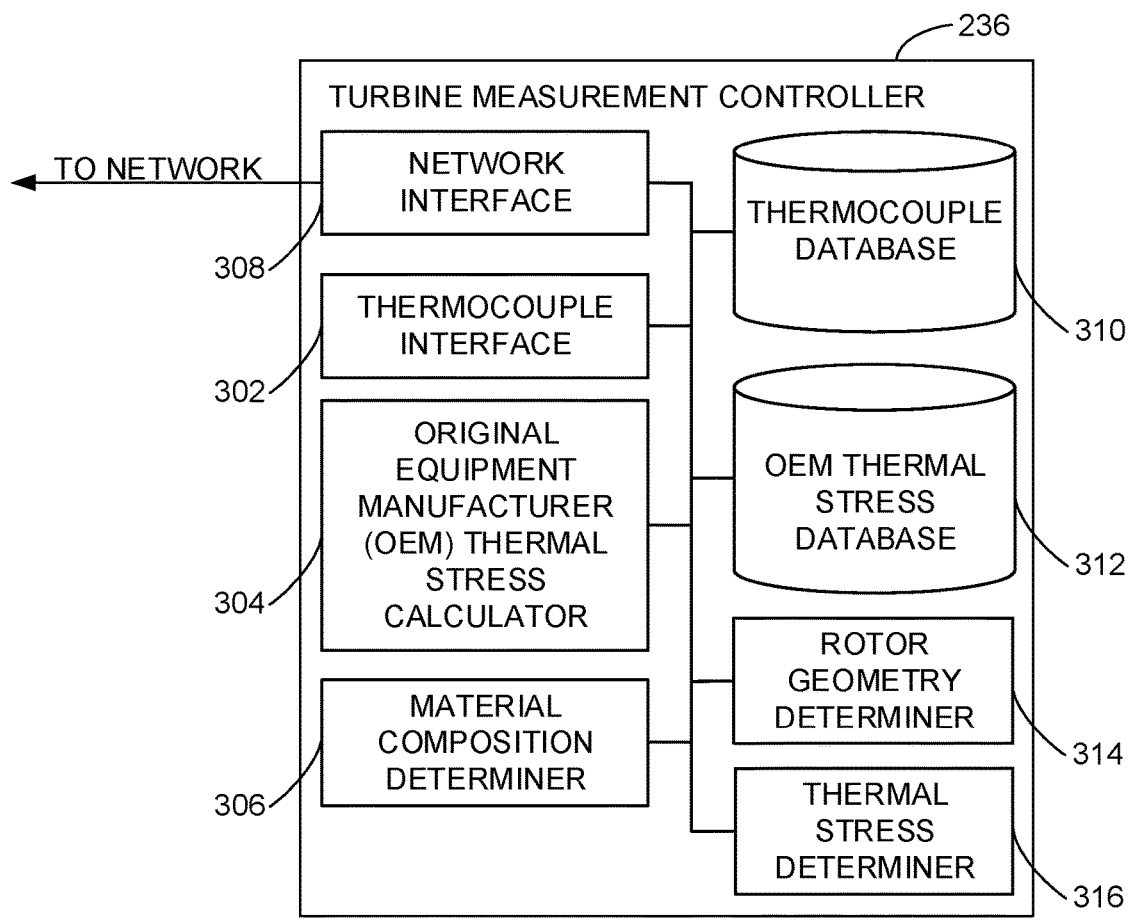
FIG. 3A is a block diagram of an example implementation of the turbine measurement controller of FIG. 2 to determine an example geometry of the example turbine of FIGS. 1A, 1B, and/or 2.

FIG. 3A is a block diagram of an example implementation of the turbine measurement controller 236 of FIG. 2 to obtain measurements associated with the turbine 100 of FIGS. 1A, 1B, and/or 2. In FIG. 3A, the turbine measurement controller 236 includes an example thermocouple interface 302, an example OEM thermal stress calculator 304, an example material composition determiner 306, a first example network interface 308, an example thermocouple database 310, a first example OEM thermal stress database 312, an example rotor geometry determiner 314, and an example thermal stress determiner 316.

In the illustrated example of FIG. 3A, the turbine measurement controller 236 includes the thermocouple interface 302 to obtain temperature readings from the thermocouples 242, 244, 246 of FIG. 2. In FIG. 3A, the thermocouple interface 302 receives and/or otherwise obtains thermocouple readings or measurements (e.g., a resistance measurement, a current measurement (e.g., a 4-20 milliamp (mA) current measurement), etc.) from at least one of the first thermocouple 242, the second thermocouple 244, and/or the third thermocouple 246. In some examples, the thermocouple interface 302 records and/or otherwise generates a timestamp associated with an obtained thermocouple measurement. Additionally or alternatively, the thermocouple interface 302 can include and/or otherwise implement a thermistor interface coupled to thermistor(s), an infrared thermometer interface coupled to infrared thermometer(s), and/or any other appropriate interface to obtain temperature measurements from the turbine 100.

In some examples, the thermocouple interface 302 records first temperature values (e.g., temperatures at the thermocouples 242, 244, and/or 246) over a time interval (e.g., a time interval corresponding to at least a portion of at least one of a startup procedure or a shutdown procedure of the turbine rotor 222). In some of these examples, the thermocouple interface 302 obtains the first temperature values (e.g., temperatures at the thermocouples 242, 244, and/or 246) at the first radial node (e.g., the reference node 146) from a thermocouple at an inlet of a stage of the turbine (e.g., the thermocouples 242, 244, and/or 246 proximate the high pressure, intermediate pressure, and low pressure inlets 107, 109, 112).

In the illustrated example of FIG. 3A, the turbine measurement controller 236 includes the OEM thermal stress calculator 304 to generate thermal stress values associated with one or more components of the turbine 100 and/or, more generally, the turbine 100. For example, the OEM thermal stress calculator 304 can be a first thermal stress calculator 304. In some examples, the first thermal stress calculator 304 calculates and/or records first thermal stress values at one or more of the radial nodes (e.g., the nodes 146, 148, 150, and/or 152) over a time interval. In some examples, the OEM thermal stress calculator 304 is implemented by black-box logic (e.g., obfuscated or inaccessible logic, machine readable instructions, etc.) established by the OEM of the turbine 100. In such examples, the OEM thermal stress calculator 304 outputs thermal stress values for various portions (e.g., physical locations) of a turbine rotor (e.g., the first rotor 222) and/or can provide warnings of excessive and/or dangerous thermal stress values within the turbine rotor. In some examples, the OEM thermal stress calculator 304 can provide calculated output(s) in a stand-alone logic device, software environment, database, etc., associated with the turbine 100. In some examples, the OEM thermal stress calculator 304 can provide calculated output(s) to a proprietary software package (e.g., proprietary to the OEM) such that exportation of the calculated output(s) becomes difficult or not possible.

In the illustrated example of FIG. 3A, the turbine measurement controller 236 includes the material composition determiner 306 to calculate, obtain, and/or otherwise receive the material composition (e.g., the chemical composition) of the rotors 222, 226, 230. For example, the material composition determiner 306 can receive the material composition of the rotors 222, 226, 230 via manual input. For example, the material composition determiner 306 can determine the material composition via a sensor.

In the illustrated example of FIG. 3A, the turbine measurement controller 236 includes the first network interface 308 to obtain information from and/or transmit information to the turbine drive controller 234 and/or the network 238 of FIG. 2. In some examples, the first network interface 308 implements a web server that receives first information (e.g., turbine revolution speed, load conditions, boiler conditions, etc.) from and/or transmits second information (e.g. actuating commands) to the turbine drive controller 234. In some examples, the first network interface 308 implements the web server that receives third information (e.g., material parameter determinations, etc.) from and/or transmits fourth information (e.g., turbine geometry and material composition, thermocouple readings, OEM thermal stress values, etc.) to the turbine parameter determiner 240. In some examples, at least one of the first, second, third, or fourth information is formatted as a hypertext transfer protocol (HTTP) message. However, any other message format and/or protocol may additionally or alternatively be used such as, for example, a file transfer protocol (FTP), a simple message transfer protocol (SMTP), an HTTP secure protocol (HTTPS), etc. In the example of FIG. 3A, the first network interface 308 facilitates the transmission of OEM thermal stress data and accompanying timestamps from the first OEM thermal stress database 312 to an OEM thermal stress database (e.g., a second OEM thermal stress database) of the turbine parameter determiner 240 of FIG. 4. In the example of FIG. 3A, the first network interface 308 facilitates the transmission of thermocouple readings and accompanying timestamps from the thermocouple database 310 to the turbine parameter determiner 240. In the example of FIG. 3A, the first network interface 308 facilitates the receipt of material parameters and/or material parameter information by the thermal stress determiner 316 from the turbine parameter determiner 240.

In the illustrated example of FIG. 3A, the turbine measurement controller 236 includes the thermocouple database 310 to record data (e.g., temperature values obtained from the thermocouples 242, 244, 246 of FIG. 2, corresponding timestamps, etc.). In some examples, the thermocouple database 310 stores temperature values obtained from devices different from the thermocouples 242, 244, 246 of FIG. 2, such as one or more thermistors, one or more infrared thermometers, etc.

The thermocouple database 310 can be implemented by a volatile memory (e.g., a Synchronous Dynamic Random Access Memory (SDRAM), Dynamic Random Access Memory (DRAM), RAMBUS® Dynamic Random Access Memory (RDRAM®), etc.) and/or a non-volatile memory (e.g., flash memory). The thermocouple database 310 may additionally or alternatively be implemented by one or more double data rate (DDR) memories, such as DDR, DDR2, DDR3, DDR4, mobile DDR (mDDR), etc. The thermocouple database 310 may additionally or alternatively be implemented by one or more mass storage devices such as hard disk drive(s), compact disk drive(s), digital versatile disk drive(s), solid-state disk drive(s), etc. While in the illustrated example the thermocouple database 310 is illustrated as a single database, the thermocouple database 310 may be implemented by any number and/or type(s) of databases. Furthermore, the data stored in the thermocouple database 310 may be in any data format such as, for example, binary data, comma delimited data, tab delimited data, structured query language (SQL) structures, etc.

In the illustrated example of FIG. 3A, the turbine measurement controller 236 includes the first OEM thermal stress database 312 to record data (e.g., thermal stress values calculated by the OEM thermal stress calculator 304, corresponding timestamps, etc.). For example, the first OEM thermal stress database 312 can be a first thermal stress database 312. The first OEM thermal stress database 312 may be implemented by a volatile memory (e.g., a SDRAM, DRAM, RDRAM®, etc.) and/or a non-volatile memory (e.g., flash memory). The first OEM thermal stress database 312 may additionally or alternatively be implemented by one or more DDR memories, such as DDR, DDR2, DDR3, DDR4, mDDR, etc. The first OEM thermal stress database 312 may additionally or alternatively be implemented by one or more mass storage devices such as hard disk drive(s), compact disk drive(s), digital versatile disk drive(s), solid-state disk drive(s), etc. While in the illustrated example the first OEM thermal stress database 312 is illustrated as a single database, the first OEM thermal stress database 312 may be implemented by any number and/or type(s) of databases. Furthermore, the data stored in the first OEM thermal stress database 312 may be in any data format such as, for example, binary data, comma delimited data, tab delimited data, SQL structures, etc.

In the illustrated example of FIG. 3A, the turbine measurement controller 236 includes the rotor geometry determiner 314 to determine geometric properties associated with a rotor of the turbine 100 based on at least one of manual input, sensors, and/or lookup modules or tables. Typically, rotors used in turbines do not have a consistent diameter throughout the axial length the rotor spans along a shaft. For example, the first rotor 222 has a significantly larger radius near the high pressure outlet 108 than near the high pressure inlet 107. In such examples, the rotor geometry determiner 314 can determine the outlet radius (e.g., the radius near the high pressure outlet 108), the inlet radius (e.g., the radius near the high pressure inlet 107), the radius of a central bore of the rotor, a profile (e.g., a nonlinear profile) between the inlet radius and outlet radius, and/or any other geometrical profile of a rotor and/or a turbine. In some examples, the rotor geometry determiner 314 is configured to determine a geometry (e.g., a diameter, radius, etc.) of the turbine rotor (e.g., the first rotor 222, the second rotor 226, and/or the third rotor 230 of FIG. 2) of a turbine (e.g., the turbine 100 of FIGS. 1A and/or 2). For example, the rotor geometry determiner 314 can determine the geometries of components of a rotor (e.g., one of the rotors 222, 226, 230) such as the blades 232.

In the illustrated example of FIG. 3A, the turbine measurement controller 236 includes a thermal stress determiner 316 to determine, via material parameters and/or material parameter information determined using the methods disclosed herein, thermal stresses in one or more turbine rotors such as the rotors 222, 226, 230. For example, the thermal stress determiner 316 can utilize the determined thermal diffusivity, Young's modulus, coefficient of thermal expansion, thermal conductivity, specific heat capacity, density, and/or Poisson's ratio, along with thermocouple readings (e.g., from thermocouples 242, 244, 246) to determine the thermal stresses present in the one or more turbine rotors.

While an example manner of implementing the turbine measurement controller 236 is illustrated in FIG. 3A, one or more of the elements, processes and/or devices illustrated in FIG. 3A may be combined, divided, re-arranged, omitted, eliminated and/or implemented in any other way. Further, the example thermocouple interface 302, OEM thermal stress calculator 304, material composition determiner 306, first network interface 308, rotor geometry determiner 314, thermal stress determiner 316, and/or, more generally, the example turbine measurement controller 236 of FIG. 3A may be implemented by hardware, software, firmware and/or any combination of hardware, software and/or firmware. Thus, for example, any of the example thermocouple interface 302, OEM thermal stress calculator 304, material composition determiner 306, first network interface 308, rotor geometry determiner 314, thermal stress determiner 316, and/or, more generally, the example turbine measurement controller 236 of FIG. 3A could be implemented by one or more analog or digital circuit(s), logic circuits, programmable processor(s), programmable controller(s), GPU(s), DSP(s), ASIC(s), PLD(s) and/or FPLD(s). When reading any of the apparatus or system claims of this patent to cover a purely software and/or firmware implementation, at least one of the example thermocouple interface 302, OEM thermal stress calculator 304, material composition determiner 306, network interface 308, rotor geometry determiner 314, first thermal stress determiner 316, and/or, more generally, the example turbine measurement controller 236 of FIG. 3A is/are hereby expressly defined to include a non-transitory computer readable storage device or storage disk such as a memory, a digital versatile disk (DVD), a compact disk (CD), a Blu-ray disk, etc. including the software and/or firmware. Further still, the example turbine measurement controller 236 of FIG. 3A may include one or more elements, processes and/or devices in addition to, or instead of, those illustrated in FIG. 3A and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3B:
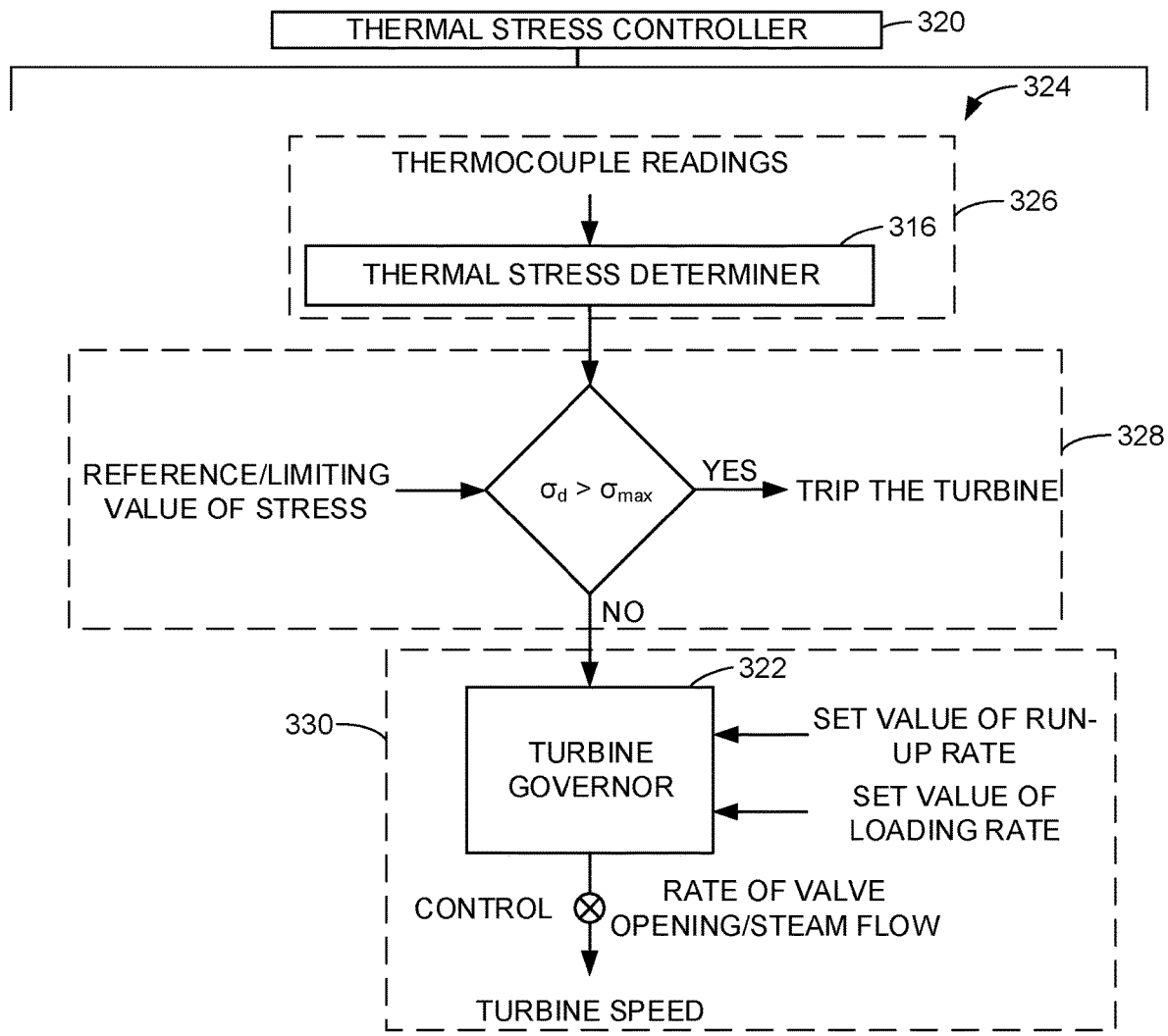
FIG. 3B is a diagram of an example turbine stress controller implemented by the example turbine drive controller of FIG. 2 and the example turbine measurement controller of FIGS. 2 and/or 3A to adjust speed of the example turbine of FIGS. 1A, 1B, and/or 2 based on thermal stress.

FIG. 3B is a diagram of an example thermal stress controller 320 implemented by the example turbine drive controller 234 of FIG. 2 and the example turbine measurement controller 236 of FIGS. 2 and/or 3A to adjust speed of the example turbine 100 of FIGS. 1A, 1B, and/or 2 based on thermal stress (e.g., thermal stress determined by the thermal stress determiner 316 of FIG. 3A). In the example of FIG. 3B, the thermal stress controller 320 can monitor and/or control the operation of the turbine 100. In the example of FIG. 3B, the thermal stress controller 320 is implemented by at least the turbine measurement controller 236 of FIG. 2 and the turbine drive controller 234 of FIGS. 2 and/or 3. For example, the thermal stress controller 320 can be implemented by a flowchart representative of an example process 324 that can be carried out while utilizing example machine readable instructions that can be executed and/or example hardware configured to implement the thermal stress controller 320. In such examples, the thermal stress controller 320 can be implemented by example hardware logic, machine readable instructions, hardware implemented state machines, and/or any combination thereof.

In the example of FIG. 3B, the thermal stress controller 320 supervises unsteady thermomechanical states of the turbine 100 and directly influences its safe operation. An example task of the thermal stress controller 320 is to control turbine start-up and/or shutdown procedures to safely stay within the loading capabilities of the turbine 100 as determined by maximum thermal stress values. The thermal stress controller 320 can enable fast changes to thermal loading to protect the turbine 100 against exceeding the permissible stresses. The thermal stress controller 320 can control the turbine 100 by setting and/or otherwise correcting the speed and/or load increase(s) and decrease(s). The setting and/or correcting of the speed and/or load increase(s) and decrease(s) can be implemented in an example turbine governor 322. For example, the turbine governor 322 can include one or more throttle governor(s), governing valve(s), bypass valve(s), etc.

The degree and/or magnitude of limiting the rate of speed and load variation can be a function of maximum effort (e.g., failure strength, ultimate strength, yield strength, etc.) of the most highly loaded location of the major components of the turbine 100. For example, frequently the first and second rotors 222, 226 (e.g., the high pressure and intermediate pressure rotors) and their respective casings (e.g., the first and second casings 220, 224) are the first points of failure in the turbine 100 due to excess thermal stresses. Component (e.g., directional component) thermal stresses can be calculated at highly loaded locations (e.g., the most high-loaded locations) based on the temperature inputs provided by the thermocouples 242, 244, 246 located at the high pressure, intermediate pressure, and low pressure stages 102, 104, 106, and/or a first combined stage of steam entering the high pressure and intermediate pressure stages 102, 104 in parallel. Thermal stresses arising due to a startup and/or shutdown procedure(s) are compared with permissible stresses (e.g., maximum stresses) derived from material fatigue, creep, deformation, and/or yield characteristics, etc. On the basis of this comparison, the relative loads of components of the turbine 100 (e.g., the rotors 222, 226, 230 and/or the casings 220, 224, 228 etc.) are determined and expressed as a load fraction (e.g., a fraction of the permissible/maximum load).

In the example of FIG. 3B, an example thermal stress control process 324 begins when, at block 326 indicated by a dashed outline, the thermal stress determiner 316 determines thermal stresses present in a rotor based on thermocouple readings (e.g. thermocouple readings from the first, second, and third thermocouples 242, 244, 246). For example, the thermal stress determiner 316 can use determined material parameters such as the thermal diffusivity, Young's modulus, coefficient of thermal expansion, Poisson's ratio, thermal conductivity, specific heat capacity, and/or density in conjunction with one or more of the thermocouple readings (e.g. thermocouple readings from the first, second, and third thermocouples 242, 244, 246) to determine the thermal stresses in the turbine 100.

The thermal stress controller 320 can then compare the determined thermal stresses ($\sigma_d$) determined by the thermal stress determiner 316 to reference, limiting, and/or maximum thermal stresses ($\sigma_{max}$) for one or more locations in the turbine 100. (Block 328 indicated by a dashed outline). For example, the thermal stress controller 320 can determine whether one or more of the determined thermal stresses ($\sigma_d$) exceed one or more of the maximum thermal stresses ($\sigma_{max}$), and in turn actuate the governor 322 to trip the turbine 100. (e.g., Block 328 returns YES). For example, the governor 322, the turbine drive controller 324, and/or the turbine measurement controller 326, etc., can actuate one or more steam dump and/or trip valves to open, venting steam from the turbine 100 to relieve temperature and/or pressure in one or more stages (e.g., one of the stages 102, 104, 106) of the turbine 100 undergoing excessive thermal stress. For example, if the determined thermal stresses do not exceed maximum thermal stresses (e.g., Block 628 returns NO), the turbine governor 322 can set a revised value of the run-up rate of the turbine and/or the loading rate of the turbine. For example, if the determined thermal stresses are close to but not exceeding the maximum thermal stresses, the governor 322 can lower the run-up and/or the loading rate to decrease the rate of temperature change in one or more stages (e.g., stages 102, 104, 106) of the turbine 100 and in turn lower thermal stresses. (Block 330 indicated by a dashed outline).

In the example of FIG. 3B, the governor 322 can set the value of the run-up rate and the loading rate of the turbine 100 by controlling the steam flow into one or more stages (e.g., the high pressure, intermediate pressure, and low pressure stages 102, 104, 106) of the turbine 100 (e.g., via one or more throttle governor(s), governing valve(s), bypass valve(s), etc.). In other examples, the governor 322 can in turn set the run-down rate of the turbine 100. For example, the governor 322 can control the flow of steam into one or more stages of the turbine 100 by opening and closing, in part or in whole, one or more dump and/or trip valve(s), governing valve(s), bypass valve(s), etc., fluidly coupled to the turbine 100 at one or more convenient locations to quickly and effectively dump and/or drain steam from the turbine 100 at desirable locations to mitigate thermal stress.

Figure 4:
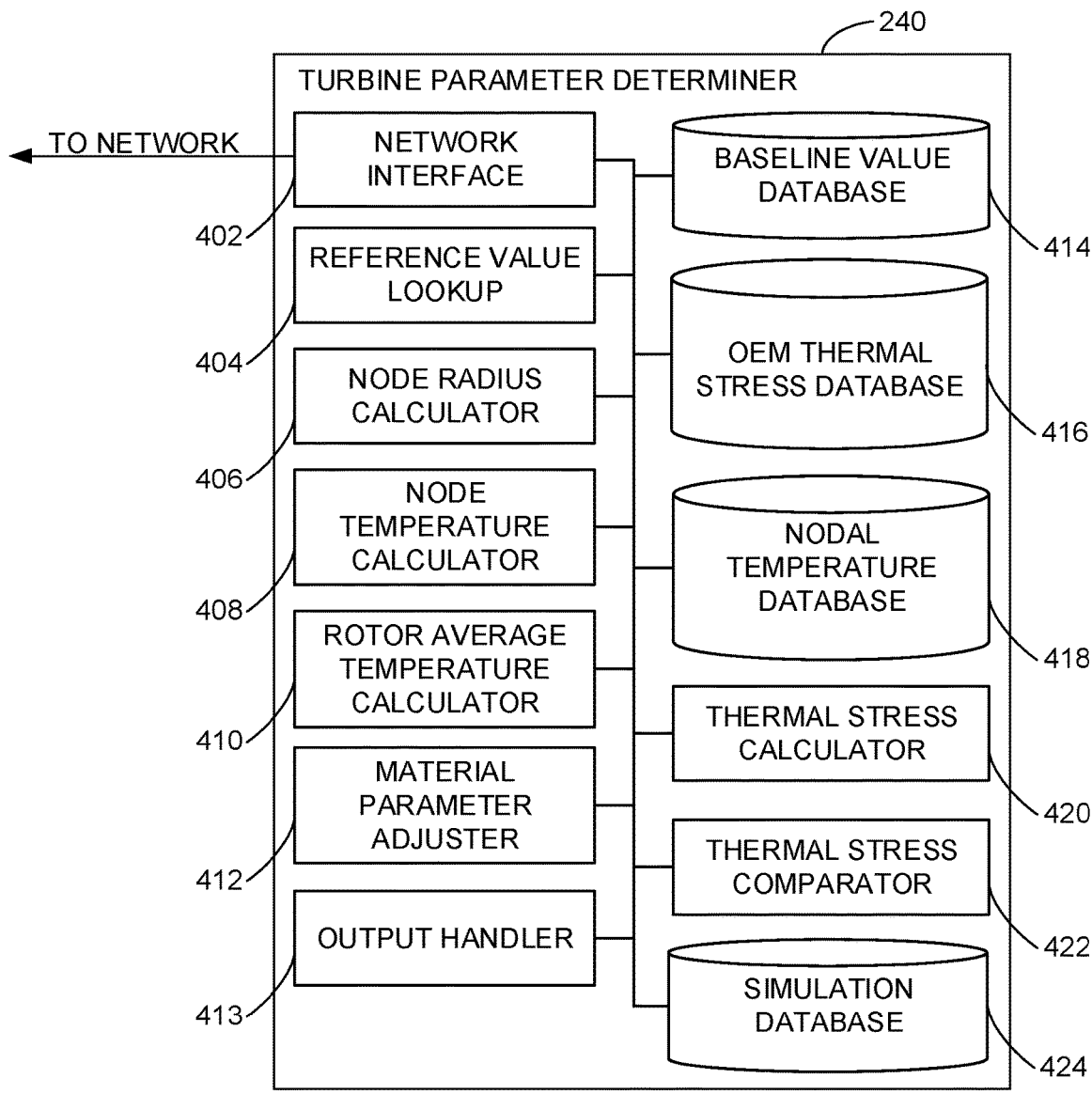
FIG. 4 is a block diagram of an example implementation of the turbine parameter determiner of FIG. 2 to determine the material parameters associated with the example turbine of FIGS. 1A, 1B, and/or 2.

FIG. 4 is a block diagram of an example implementation of the turbine parameter determiner 240 of FIG. 2 to determine the material parameters (e.g., the thermal diffusivity, Young's modulus, coefficient of thermal expansion, density, Poisson's ratio, etc.) associated with the turbine 100 of FIGS. 1A, 1B, and/or 2. In FIG. 4, the turbine parameter determiner 240 includes a second example network interface 402, an example reference value lookup 404, an example node radius calculator 406, an example node temperature calculator 408, an example rotor average temperature calculator 410, an example material parameter adjuster 412, an example output handler 413, an example thermal stress calculator 420, an example thermal stress comparator 422, an example baseline value database 414, a second example OEM thermal stress database 416, an example nodal temperature database 418, and an example simulation database 424.

In the illustrated example of FIG. 4, the turbine parameter determiner 240 includes the second network interface 402 to obtain information from and/or transmit information to the turbine measurement controller 236 of FIGS. 2 and/or 3 via the network 238 of FIG. 2. In some examples, the second network interface 402 implements a web server that receives first information (e.g., OEM thermal stress values, thermocouple readings, timestamps, turbine geometry, turbine materials, etc.) from and/or transmits second information (e.g., determiner material parameters and/or material parameter information) to the turbine measurement controller 236. In some examples, at least one of the first information or the second information is formatted as an HTTP message. However, any other message format and/or protocol may additionally or alternatively be used such as, for example, an FTP, an SMTP, an HTTPS protocol, etc. In the example of FIG. 4, the second network interface 402 facilitates the receipt of OEM thermal stress data and accompanying timestamps by the second OEM thermal stress database 416 from the first OEM thermal stress database 312. In the example of FIG. 4, the second network interface 402 facilitates the receipt of thermocouple readings and accompanying timestamps by the nodal temperature database 418 from the thermocouple database 310. In the example of FIG. 4, the second network interface 402 facilitates the transmission of material parameters and/or material parameter information from the turbine parameter determiner 240 to the turbine measurement controller 236.

In the illustrated example of FIG. 4, the turbine parameter determiner 240 includes the reference value lookup 404 to determine baseline value(s) (e.g., initialization values) for material parameter(s) (e.g., the thermal diffusivity, Young's modulus, coefficient of thermal expansion, thermal conductivity, specific heat capacity, density, Poisson's ratio, etc.) and makes the baseline value(s) available to other aspects of the turbine parameter determiner 240 (e.g., the node temperature calculator 408, the thermal stress calculator 420, the material parameter adjuster 412, etc.) to determine updated values of the material parameter(s) and/or updated material parameter information of a rotor of interest (e.g., one of the rotors 222, 226, 230) of the turbine 100. In some examples, the reference value lookup 404 selects the baseline values of the material parameters from the baseline value database 414 based on stored and/or otherwise available information associated with the rotor of interest. For example, the reference value lookup 404 can select baseline material property values based on a known material composition (e.g., chemical composition) stored in the baseline value database 414 for the rotor of interest.

In the illustrated example of FIG. 4, the turbine parameter determiner 240 includes the node radius calculator 406 to select (e.g., determine, receive as input, etc.) a quantity of nodes (e.g., representative nodes, virtual nodes, etc.) to be utilized in a computational heat transfer analysis of the turbine 100. In some examples, the node radius calculator 406 calculates and/or otherwise determine positions (e.g., representative positions, virtual positions, etc.) on a rotor of the turbine 100. For example, node radius calculator 406 can determine the positions to correspond to the nodes 146, 148, 150, 152 of FIG. 1B. In some examples, the node radius calculator 406 determines the positions by spacing the nodes 146, 148, 150, 152 at radial distances from the central bore 144 of the first rotor 222 and/or a central axis of the first rotor 222. For example, the node radius calculator 406 can calculate the positions of the nodes 146, 148, 150, 152 based on the logic depicted in the illustrated example of FIG. 5. For example, the node radius calculator 406 can select radial nodes (e.g., the nodes 146, 148, 150, 152) of the turbine rotor 100, the radial nodes including a first radial node (e.g., the reference node 146) corresponding to an outermost node of the radial nodes.

In some examples, the node radius calculator 406 calculates radial node locations of radial nodes (e.g., the nodes 146, 148, 150, 152 of FIG. 1B) on the turbine rotor (e.g., one of the rotors 222, 226, 230), the radial nodes including a first radial node (e.g., the reference node 146) corresponding to an outermost node of the radial nodes. In some examples, the radial nodes include a second radial node (e.g., the first node 148) radially inward from the first radial node (e.g., the reference node 146) defining a first distance (e.g., the first radial distance 156 of FIG. 1B) therebetween, a third radial node (e.g., the second node 150) radially inward from the second radial node (e.g., the first node 148), and a fourth radial node (e.g., a third node radially inward along the radial line 154 relative to the nodes 146, 148, 150) radially inward from the third radial node (e.g., the second node 150) defining a second distance therebetween, the first distance less than the second distance. The node radius calculator 406 can calculate the radial node locations of the radial nodes (e.g., the nodes 146, 148, 150, 152) by calculating respective radiuses of the radial nodes.

In the illustrated example of FIG. 4, the turbine parameter determiner 240 includes the node temperature calculator 408 to calculate and/or otherwise determine the temperature of internal nodes (e.g., the nodes 148, 150, 152 of FIG. 1B) based on improved (e.g., iteratively improved) or updated (e.g., iteratively updated) material parameters and/or the thermocouple measurements obtained from the thermocouples 242, 244, 246 of FIG. 2. For example, the node temperature calculator 408 can apply the finite difference method of heat transfer to calculate conduction in a rotor of the turbine 100. In such examples, the node temperature calculator 408 can calculate and/or otherwise determine the temperature of internal radial nodes of the rotor based on the logic depicted in the illustrated example of FIG. 6. For example, the node temperature calculator 408 can calculate and/or determine second temperature values (e.g., the first, second, and Nth temperatures 624, 626, 628) at respective internal nodes (e.g., the first, second, and Nth nodes 148, 150, 152) to the first radial node (e.g., the reference node 146).

In the illustrated example of FIG. 4, the turbine parameter determiner 240 includes the rotor average temperature calculator 410 to calculate and/or otherwise determine an average temperature of a rotor of the turbine 100 by weighing the temperatures of the radial nodes according to the discs defined by the relative positions of the radial nodes. For example, a first disc can be defined by the radiuses of the reference node 146 and the first node 148 of FIG. 1B, a second disc can be defined by the radiuses of the first node 148 and the second node 150, etc. For example, the rotor average temperature calculator 410 can determine an average temperature of a rotor of the turbine 100 based on the logic depicted in the illustrated example of FIG. 7.

In the illustrated example of FIG. 4, the turbine parameter determiner 240 includes the material parameter adjuster 412 to execute iterative adjustments to material parameters (e.g., the thermal diffusivity, Young's modulus, coefficient of thermal expansion, thermal conductivity, specific heat capacity, density, Poisson's ratio, etc.) of interest based on a comparison of (1) first thermal stress values calculated by the thermal stress calculator 420 and (2) second thermal stress values calculated by the OEM thermal stress calculator 304 of FIG. 3A. For example, the material parameter adjuster 412 can adjust the values of the material parameters upwards or downwards based on previously iterated values (e.g., iterated from the selected baseline values). In such examples, the adjustments can be based on the comparison to reduce a difference between the first thermal stress values and the second thermal stress values.

In the illustrated example of FIG. 4, the turbine parameter determiner 240 includes the output handler 413 to identify, select, etc., information to be transmitted to a different entity than the turbine parameter determiner 240. In some examples, the output handler 413 can identify thermal stress values stored in the simulation database 424 and/or the second OEM thermal stress database 416, temperature values stored in the nodal temperature database 418, iterated material parameters and/or material parameter information stored in the simulation database 424, final material parameters and/or material parameter information from the thermal stress comparator 422, etc., and/or a combination thereof. In some examples, the output handler 413 can transmit the identified data to the turbine measurement controller 236, the network 238, a process control system, etc., via the second network interface 402.

In the illustrated example of FIG. 4, the turbine parameter determiner 240 includes the baseline value database 414 to record data. In the example of FIG. 4, the data includes baseline values of material parameters (e.g., the thermal diffusivity, Young's modulus, coefficient of thermal expansion, thermal conductivity, specific heat capacity, density, Poisson's ratio, etc.) of one or more rotors of turbines such as the turbine 100. In some examples, the baseline value database 414 stores a single baseline value for each material parameter. In some examples, the baseline value database 414 stores a variety of baseline values for each material parameter wherein the baseline value(s) are correlated with known parameters of a rotor and/or the turbine 100. For example, the baseline values for the material parameters can be correlated with a make and/or model of a rotor/turbine manufacturer, chemical composition(s) of the rotor, etc.

In the illustrated example of FIG. 4, the turbine parameter determiner 240 includes the second OEM thermal stress database 416 to record data (e.g., thermal stress values calculated by the OEM thermal stress calculator 304 of FIG. 3A, corresponding timestamps, etc.). For example, the second OEM thermal stress database 416 can be a second thermal stress database 416. In some examples, the second OEM thermal stress database 416 is in communication with the first OEM thermal stress database 312 of FIG. 3A via the first network interface 308 of FIG. 3A and the second network interface 402. In such examples, the first OEM thermal stress database 312 and the second OEM thermal stress database 416 can be synchronized with respect to each other to store an entirety or totality of the thermal stress values and associated timestamps calculated by the OEM thermal stress calculator 304 of FIG. 3A.

In the illustrated example of FIG. 4, the turbine parameter determiner 240 includes the nodal temperature database 418 to record data. For example, the nodal temperature database 418 can record data including the calculated temperatures of internal radial nodes (e.g., the nodes 148, 150, 152 of FIG. 1B) at desired steps in time along with reference temperature values (e.g., thermocouple measurements obtained from the thermocouples 242, 244, 246 of FIG. 2 for the reference node 146). In some examples, the nodal temperature database 418 and the thermocouple database 310 of FIG. 3A can be synchronized with respect to each other to store the same or current reference temperature values and accompanying timestamps.

In the illustrated example of FIG. 4, the turbine parameter determiner 240 includes the thermal stress calculator 420 to calculate and/or otherwise determine thermal stresses (e.g., thermal stress values) based on material parameters such as the coefficient of thermal expansion, Young's modulus, thermal conductivity, specific heat capacity, Poisson's ratio, and/or density of a material of a rotor of the turbine 100. For example, the thermal stress calculator 420 can be a second thermal stress calculator 420. In some examples, the thermal stress calculator 420 determines the thermal stresses based on the material properties determined by the material parameter adjuster 412, an average temperature of the rotor calculated by the rotor average temperature calculator 410, and a temperature of the rotor at a desired position determined by the node temperature calculator 408. For example, the thermal stress calculator 420 can determine values (e.g., numerical values) for the material parameters (e.g., the coefficient of thermal expansion, Young's modulus, thermal conductivity, specific heat capacity, Poisson's ratio, and/or density) at respective radial nodes (e.g., the nodes 146, 148, 150, 152) at simulated steps on a time interval. In some examples, the thermal stress calculator 420 calculates thermal stress values at discrete nodes (e.g., the virtual nodes created by the node radius calculator 406) and can extrapolate such thermal stress values to the entire rotor.

In the illustrated example of FIG. 4, the turbine parameter determiner 240 includes the thermal stress comparator 422 to compare (e.g., determine a difference, determine an absolute difference, etc.) between the first thermal stress values calculated by the OEM thermal stress calculator 304 of FIG. 3A and second thermal stress values calculated by the thermal stress calculator 420. For example, the thermal stress comparator 422 can determine if the absolute difference between the first thermal stress values and the second thermal stress values is within a threshold. In response to the absolute differences between the first thermal stress values and the second thermal stress values not satisfying a threshold, the thermal stress comparator 422 can signify the magnitude and direction of the differences between the first thermal stress values and the second thermal stress values to the material parameter adjuster 412.

In the illustrated example of FIG. 4, the turbine parameter determiner 240 includes the simulation database 424 to record data (e.g., the thermal stress values calculated by the thermal stress calculator 420, corresponding timestamps, etc.). In the example of FIG. 4, the simulation associated with the simulation database 424 includes the iterative comparison between the thermal stress calculated by the thermal stress calculator 420 based on currently iterated material parameters and the thermal stress of the second OEM thermal stress database 416. For example, at a first iteration, the simulation can include a comparison performed by the thermal stress comparator 422 between thermal stress values calculated by the thermal stress calculator 420 using material parameters at a first iteration and the thermal stress values from the second OEM thermal stress database 416. After this comparison and before the second iteration of the simulation, the simulation can include adjusting the material parameters with the material parameter adjuster 412 that are the basis by which the thermal stress calculator 420 calculates thermal stress. Subsequently, at a second iteration, the simulation can include a comparison performed by the thermal stress comparator 422 between thermal stress values calculated by the thermal stress calculator 420 using the material parameters at the second iteration and the same thermal stress values from the second OEM thermal stress database 416, etc.

At least one of the baseline value database 414, the second OEM thermal stress database 416, the nodal temperature database 418, or the simulation database 424 may be implemented by a volatile memory (e.g., a SDRAM, DRAM, RDRAM®, etc.) and/or a non-volatile memory (e.g., flash memory). At least one of the baseline value database 414, the second OEM thermal stress database 416, the nodal temperature database 418, or the simulation database 424 may additionally or alternatively be implemented by one or more DDR memories, such as DDR, DDR2, DDR3, DDR4, mDDR, etc. At least one of the baseline value database 414, the second OEM thermal stress database 416, the nodal temperature database 418, or the simulation database 424 may additionally or alternatively be implemented by one or more mass storage devices such as hard disk drive(s), compact disk drive(s), digital versatile disk drive(s), solid-state disk drive(s), etc. While in the illustrated example the baseline value database 414, the second OEM thermal stress database 416, the nodal temperature database 418, and the simulation database 424 are illustrated as single databases, at least one of the baseline value database 414, the second OEM thermal stress database 416, the nodal temperature database 418, or the simulation database 424 may be implemented by any number and/or type(s) of databases. Furthermore, the data stored in the baseline value database 414, the second OEM thermal stress database 416, the nodal temperature database 418, and/or the simulation database 424 may be in any data format such as, for example, binary data, comma delimited data, tab delimited data, SQL structures, etc.

While an example manner of implementing the turbine parameter determiner 240 is illustrated in FIG. 4, one or more of the elements, processes and/or devices illustrated in FIG. 4 may be combined, divided, re-arranged, omitted, eliminated and/or implemented in any other way. Further, the example second network interface 402, reference value lookup 404, node radius calculator 406, node temperature calculator 408, rotor average temperature calculator 410, material parameter adjuster 412, output handler 413, thermal stress calculator 420, thermal stress comparator 422 and/or, more generally, the example turbine parameter determiner 240 of FIG. 4 may be implemented by hardware, software, firmware and/or any combination of hardware, software and/or firmware. Thus, for example, any of the example second network interface 402, reference value lookup 404, node radius calculator 406, node temperature calculator 408, rotor average temperature calculator 410, material parameter adjuster 412, output handler 413, thermal stress calculator 420, thermal stress comparator 422 and/or, more generally, the example turbine parameter determiner 240 of FIG. 4 could be implemented by one or more analog or digital circuit(s), logic circuits, programmable processor(s), programmable controller(s), GPU(s), DSP(s), ASIC(s), PLD(s) and/or FPLD(s). When reading any of the apparatus or system claims of this patent to cover a purely software and/or firmware implementation, at least one of the example second network interface 402, reference value lookup 404, node radius calculator 406, node temperature calculator 408, rotor average temperature calculator 410, material parameter adjuster 412, output handler 413, thermal stress calculator 420, thermal stress comparator 422 and/or, more generally, the example turbine parameter determiner 240 of FIG. 4 is/are hereby expressly defined to include a non-transitory computer readable storage device or storage disk such as a memory, a DVD, CD, a Blu-ray disk, etc. including the software and/or firmware. Further still, the example turbine parameter determiner 240 of FIG. 4 may include one or more elements, processes and/or devices in addition to, or instead of, those illustrated in FIG. 4 and/or may include more than one of any or all of the illustrated elements, processes and devices.

Figure 5:
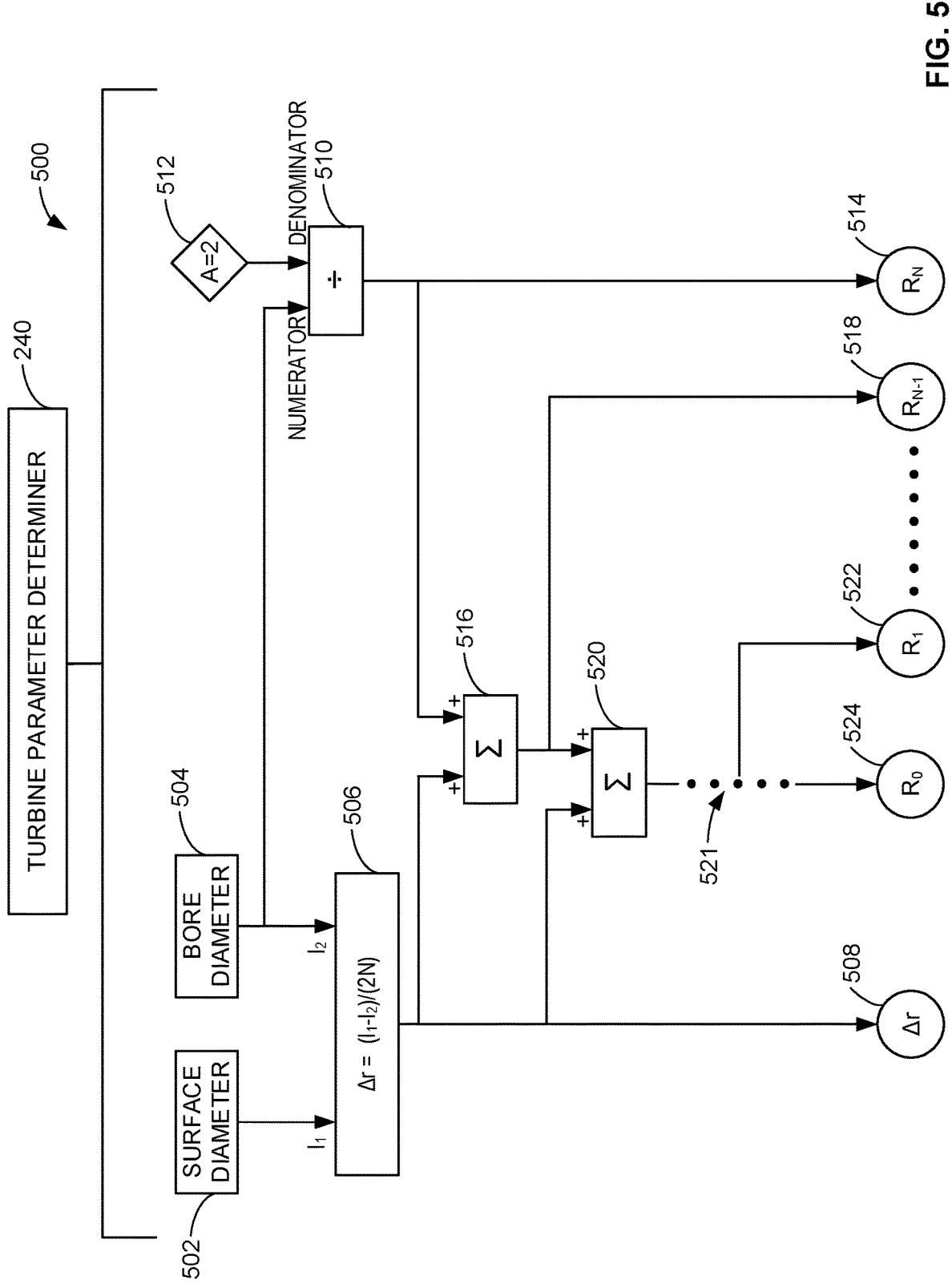
FIG. 5 is a schematic illustration of a logic determination that can be implemented by the example turbine parameter determiner of FIGS. 2 and/or 4 to determine example node radius values.

FIG. 5 is a schematic illustration of a first example logic calculation 500 that can be implemented by the turbine parameter determiner 240 of FIGS. 2 and/or 4 to determine node radius values. For example, the node radius calculator 406 of FIG. 4 can execute the first logic calculation 500. In FIG. 5, the first logic calculation 500 can correspond to an example implementation of hardware logic, machine readable instructions, hardware implemented state machines, and/or any combination thereof that can be implemented and/or otherwise executed by the node radius calculator 406 and/or, more generally, the turbine parameter determiner 240.

The first logic calculation 500 is implemented based on the section 142 of FIG. 1B, with N nodes. In FIG. 5, any number of nodes (e.g., five, 10, 20, 100, 1000 nodes, etc.) at corresponding locations can be calculated. Advantageously, the logic depicted in the first logic calculation 500 and all subsequent logic can be easily adjusted to account for any desired quantity of nodes.

In the illustrated example of FIG. 5, the first logic calculation 500 obtains as input (1) an example surface diameter 502 of a rotor (e.g., the first rotor 222 including respective blades 232 of FIG. 2) of the turbine 100 of FIGS. 1A, 1B, and/or 2 and (2) an example bore diameter 504 of the rotor of the turbine 100 (e.g., the bore 144 of FIG. 1B). In some examples, the rotor (e.g., the first rotor 222) can be integral with a shaft (e.g., the shaft 118). In such examples, the bore (e.g., the bore 144) is not present in the rotor, and a bore diameter 504 can be 0 in. In some examples, the rotor geometry determiner 314 of FIG. 3 determines the surface diameter 502 and/or the bore diameter 504 (e.g., via manual input and/or one or more sensors). In such examples, the rotor geometry determiner 314 can transmit the surface diameter 502 and/or the bore diameter 504 to the turbine parameter determiner 240 via the network 238 of FIG. 2 for processing in connection with the first logic calculation 500.

Rotors such as the first rotor 222 of FIG. 2 are typically implemented with successive arrangements (e.g., rings) of blades with the radii of successive arrangements of blades growing larger moving axially from the turbine inlet (e.g., the high pressure inlet 107) to the turbine outlet (e.g., the high pressure outlet 108). Accordingly, multiple (e.g., more than one) implementations of the first logic calculation 500 can be implemented by the node radius calculator 406 and/or, more generally, the turbine parameter determiner 240 for a rotor (e.g., the first rotor 222). Alternatively, a single calculation can be completed by the node radius calculator 406 and/or, more generally, the turbine parameter determiner 240, utilizing, for example, the average surface diameter of the rotor as the surface diameter 502 or the inlet surface diameter of a rotor as the surface diameter 502. In FIG. 5, the bore diameter 504 is constant along the axial length of a rotor. Alternatively, the bore diameter 504 may not be constant along the axial length of the rotor.

In the illustrated example of FIG. 5, the surface diameter 502 serves as a first example input $I_1$ into a first example block 506 (e.g., an operator). For example, the node radius calculator 406 can execute and/or otherwise implement the first block 506. In FIG. 5, the bore diameter 504 serves as a second example input $I_2$ into the first block 506. In other examples, where there is no central bore, the bore diameter 504 can be 0 in. In FIG. 5, the first block 506 corresponds to and/or otherwise implements a radius difference function and can be represented by the illustrated example of Equation (1) below:

$$\Delta r = \frac{I_1 - I_2}{2N} \qquad \text{Equation (1)}$$

In the example of Equation (1) above, the variable $\Delta r$ represents the radius differential between two nodes. The variable $I_1$ represents the first input corresponding to the surface diameter 502. The variable $I_2$ represents the second input corresponding to the bore diameter 504. The variable N represents the desired quantity of nodes (e.g., five, 10, 20, 100, 1000 nodes, etc.). Thus, the first block 506 outputs an example radius step 508 (e.g., $\Delta r$) corresponding to a radius difference between two nodes (e.g., a difference between the nodes 148, 150 of FIG. 1B), any two sequential nodes, etc. In some examples, the radius step 508 can be varied between nodes.

In the illustrated example of FIG. 5, the bore diameter 504 also serves as the numerator input into an example first division block 510 (e.g., a division operator). For example, the node radius calculator 406 can execute and/or otherwise implement the first division block 510. In FIG. 5, the variable A 512 serves as the denominator input into the first division block 510. In FIG. 5, the variable A 512 is set to two (e.g., A=2). In FIG. 5, the first division block 510 generates and/or otherwise outputs the radius of the Nth node 514 (e.g., $R_N$) corresponding to a radius at the bore of the rotor (e.g., the radius at the Nth node 152 of FIG. 1B). In other examples, such as an example where there is no central bore of the rotor, the radius of the Nth node 514 can be 0 in.

In the illustrated example of FIG. 5, the output of the first block 506 (e.g., the radius step 508) is the first input into a first example summation block 516. For example, the node radius calculator 406 can execute and/or otherwise implement the first summation block 516. As used herein, a summation block (e.g., the first summation block 516) generates, calculates, and/or otherwise outputs a sum of inputs to the summation block. The output of the first division block 510 (e.g., the radius of the Nth node 514) is the second input into the first summation block 516. Thus, the output of the first summation block 516 is the radius of the next node, the radius of the N-1 node 518 sequentially radially outward from the Nth node relative to the turbine 100.

In the example of FIG. 5, the N-1th node serves as an input into the second summation block 520, which adds a radius step 508 to produce the next sequentially radially outward node, the N-2$^{th}$ node (not shown). An example first dotted line 521 can represent subsequent calculations (e.g., additions of a radius step 508) to calculate the radius of one or more sequential nodes radially outward relative to the N-2$^{th}$ node (e.g., the N-3$^{th}$ node, the N-4$^{th}$ node, the N-5$^{th}$ node, etc.). In the example of FIG. 5, the first logic calculation 500 goes on to calculate the radius of the first node 522 and the radius of the reference node 524.

In some examples, the node radius calculator 406 provides the outputs of the first logic calculation 500 (e.g., the radius step 508, the radius of the Nth node 514, the radius of the N-1th node 518, the radius of the first node 522, the radius of the reference node 524) to all other aspects of the turbine parameter determiner 240. For example, the node radius calculator 406 can provide the outputs of the first logic calculation 500 to at least one of the node temperature calculator 408, the rotor average temperature calculator 410, the thermal stress calculator 420, the thermal stress comparator 422, or any other relevant aspect of the turbine parameter determiner 240.

Figure 6:
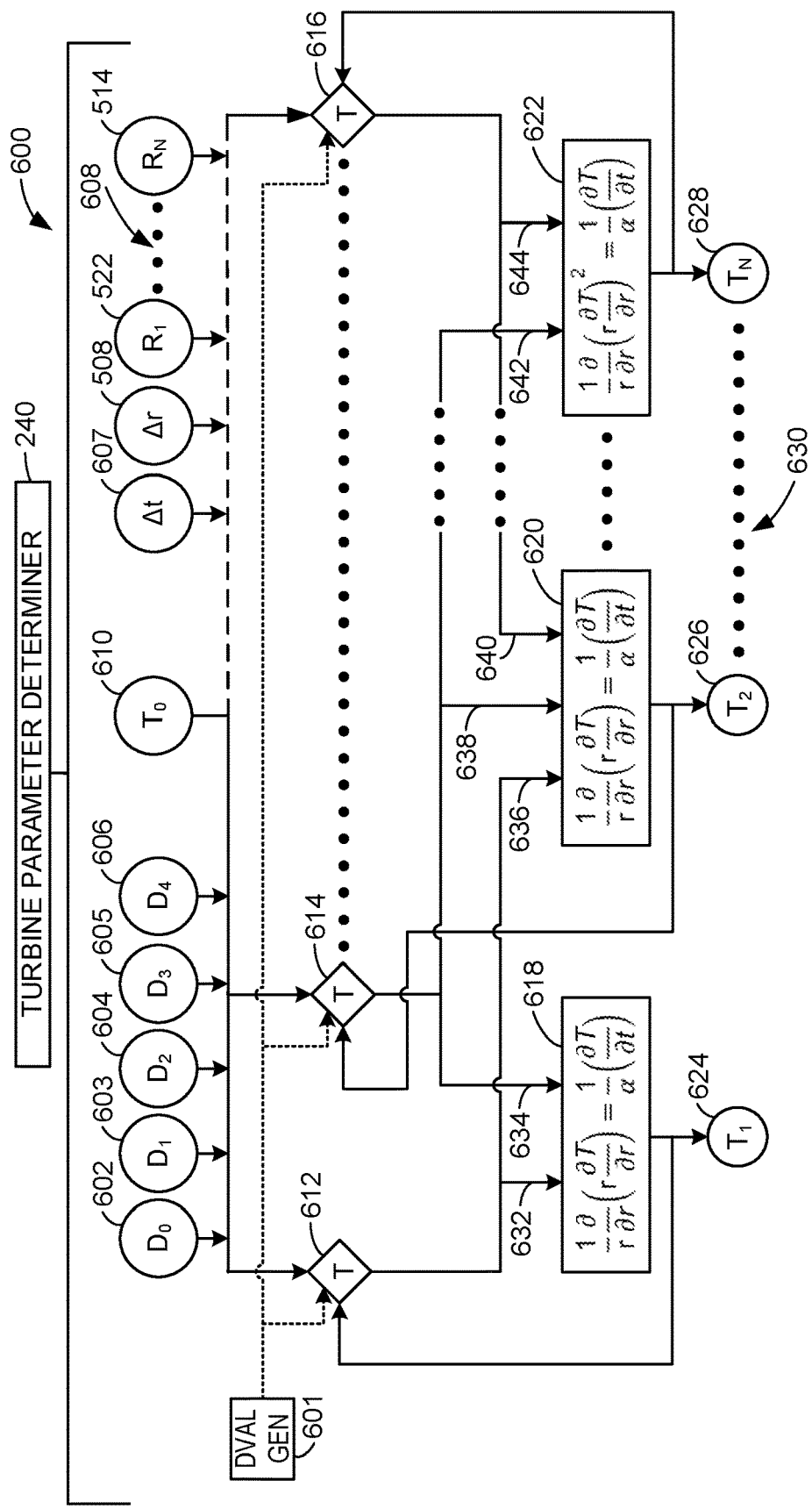
FIG. 6 is a schematic illustration of a logic determination that can be implemented by the example turbine parameter determiner of FIGS. 2 and/or 4 to determine example temperature values.

In the illustrated example of FIG. 6, the node temperature calculator 408 and/or, more generally, the turbine parameter determiner 240, utilizes the second logic calculation 600 to implement a one-dimensional transient heat conduction analysis of a turbine rotor (e.g., one of the rotors 222, 226, 230 of FIG. 2). In FIG. 6, the second logic calculation 600 can correspond to an example implementation of hardware logic, machine readable instructions, hardware implemented state machines, and/or any combination thereof that can be implemented and/or otherwise executed by the node temperature calculator 408 and/or, more generally, the turbine parameter determiner 240.

In FIG. 6, heat conduction is only considered in the radial direction (e.g., the sole dimension) for computational ease. Alternatively, heat conduction can be considered in a different number of dimensions and/or in a different coordinate system (e.g., a cartesian coordinate system, a spherical coordinate system, etc.). Thus, the turbine rotor is assumed to be a disc with or without a central bore for the computation described in FIG. 6. The disc can correspond to the cross section 142 of FIG. 1B. The assumption can be a suitable proxy, at least because impulse turbine rotors are composed of discrete and/or semi-connected blades, where the blades can be large in radial length compared to axial thickness. A typical governing partial differential equation (PDE), expressed in cylindrical coordinates, for one-dimensional heat conduction in a disc and/or cylinder is shown in the illustrated example of Equation (2) below in terms of thermal diffusivity ($\alpha$). The equation for thermal diffusivity is shown directly below Equation (2) in Equation (3).

$$\frac{1}{r}\frac{\partial}{\partial r}\left(r\frac{\partial T}{\partial r}\right) = \frac{1}{\alpha}\left(\frac{\partial T}{\partial t}\right) \qquad \text{Equation (2)}$$

$$\alpha = \frac{k}{\rho C_p} \qquad \text{Equation (3)}$$

In the example of Equation (2) above, the variable r represents the radial distance from an origin in cylindrical coordinates (e.g., the r dimension). For example, the variable r can represent the distance from the central axis of a rotor. In the example of Equation (2) above, the variable T represents the temperature of the rotor at the radius r. In the example of Equation (2) above, the variable $\alpha$ represents the thermal diffusivity at the radius r. In the example of Equation (2) above, the operator $\partial/\partial r$ represents the partial derivative with respect to radius. In the example of Equation (2) above, $$\frac{\partial T}{\partial r}$$

represents the partial derivative of the temperature with respect to the radius. In the example of Equation (2) above, the $$\frac{\partial T}{\partial t}$$

represents me partial derivative of the temperature with respect to time.

In the example of Equation (3), the variable α represents the thermal diffusivity of Equation (2) at the radius r of Equation (2). In the example of Equation (3), k represents the thermal conductivity of the conditions and position of Equation (2), p represents the density of the turbine rotor (e.g., one of the rotors 222, 226, 230), and $c_p$ represents the constant pressure specific heat capacity at the conditions and position of Equation (2).

In some examples, the governing partial differential equation corresponding to the example of Equation (2) above, is discretized into algebraic equations to allow calculation with executable logic (e.g., the second logic calculation 600 executed by the node temperature calculator 408) using numerical methods. In some of these examples, finite difference methods (e.g., numerical methods) are utilized to discretize the example of Equation (2) above. Finite difference methods for heat transfer can be applied to a mesh (e.g., a map, a quantity, etc.) of nodes (e.g., the nodes 146, 148, 150, 152). In the illustrated example of FIG. 6, the node temperature calculator 408 and/or, more generally, the turbine parameter determiner 240 reiterates the aforementioned calculations for any subsequent number of steps of time in a simulation.

In the illustrated example of FIG. 6, the node temperature calculator 408 and/or, more generally, the turbine parameter determiner 240 implements and/or otherwise executes the second logic calculation 600 though numerical methods in connection with Equations (2)-(3). In FIG. 6, an example thermal diffusivity value generation block 601 generates example polynomial coefficients $D_0$ 602, $D_1$ 603, $D_2$ 604, $D_3$ 605, $D_4$ 606. The polynomial coefficients 602, 603, 604, 605, 606 describe, as a function of temperature, a currently iterated version of the thermal diffusivity (α) associated with the material of which the rotor (e.g., the rotor 222, etc.) is composed. In other examples, a different number of polynomial coefficients (e.g., one coefficient, six coefficients, 10 coefficients, 100 coefficients, etc.) functionally describing the currently iterated version of the temperature dependent thermal diffusivity (α) can be provided to the second logic calculation 600. For example, the thermal diffusivity value generation block 601 can be implemented and/or otherwise executed by the reference value lookup 404 of FIG. 4 and/or the material parameter adjuster 412 of FIG. 4 to receive reference values of a thermal diffusivity of a material of the rotor and/or currently iterated versions of the thermal diffusivity of a material of the rotor.

In the illustrated example of FIG. 6, the second logic calculation 600 obtains as input an example timestep 607 (e.g., Δt) along with the radius step 508 (e.g., Δr) of FIG. 5, the radius of the first node 522 (e.g., the radial distance of the first node 148 from the center of the cross section 142 of FIG. 1B) of FIG. 5, and the radius of the Nth node 514 (e.g., the radial distance of the Nth node 152 from the center of the cross section 142 of FIG. 1B) of FIG. 5. In the example of FIG. 6, an example second dotted line 608 indicates one or more radiuses of nodes between the radius of the first node 522 and the radius of the Nth node 514. For example, the radius of the N-1th node 518 (FIG. 5), a radius of an N-2th node, a radius of an N-3th node, a radius of a second node (e.g., the second node 150), etc., can each be obtained as inputs to the second logic calculation 600 by the node temperature calculator 408.

In the illustrated example of FIG. 6, the second logic calculation 600 obtains as input an example reference temperature 610 (e.g., the temperature $T_0$ at the reference node 146 of FIG. 1B). In FIG. 6, the reference temperature 610 can correspond to a thermocouple measurement at an inlet of the turbine 100 of FIGS. 1A, 1B, and/or 2 and/or an inlet (e.g., one of the inlets 107, 109, 112 of FIG. 1A) of a turbine stage of the turbine 100 including a rotor upon which thermal stress is measured. For example, the turbine measurement controller 236 can acquire the reference temperature 610 from a thermocouple (e.g., one of the thermocouples 242, 244, 246). For example, an array of reference temperatures 610 and accompanying timestamps can be stored in the nodal temperature database 418 of FIG. 4 prior to the node temperature calculator 408 executing the second logic calculation 600.

In FIG. 6, the radius step 508 is constant throughout the implementation of the second logic calculation 600. Alternatively, the radius step 508 may not be constant throughout the execution of the second logic calculation 600, wherein new values of the radius of the first node 522, the radius of the Nth node 514, the radiuses of intermediate nodes, etc., can be calculated by the node radius calculator 406 and/or, more generally, the turbine parameter determiner 240.

In the example of FIG. 6, first, second, and third update blocks 612, 614, 616 govern the input of updated values of the thermal diffusivity polynomial coefficients 602, 603, 604, 605, 606 and the reference temperature 610 into the second logic calculation 600. FIG. 6 also includes first, second, and $N^{th}$ temperature calculation blocks 618, 620, 622. In the example of FIG. 6, the first and second temperature calculation blocks 618, 620 implement (e.g., via numerical methods) the PDE of Equation (2). In the example of FIG. 6, the first temperature calculation block 618 calculates a first temperature 624 of the first node 148 (FIG. 1B) and the second temperature calculation block 620 calculates a second temperature 626 of the second node 150 (FIG. 2).

In the example of FIG. 6, the $N^{th}$ temperature calculation block 622 calculates an $N^{th}$ temperature 628 of the $N^{th}$ node 152 (e.g., FIG. 2 at the inner radius) based on a modified governing PDE, expressed in cylindrical coordinates, for one-dimensional heat conduction in a disc/cylinder is shown in the illustrated example of Equation (4) below in terms of thermal diffusivity (α).

$$\frac{1}{r}\frac{\partial}{\partial r}\left(r\frac{\partial T}{\partial r}\right)^2 = \frac{1}{\alpha}\left(\frac{\partial T}{\partial t}\right) \qquad \text{Equation (4)}$$

In the example of Equation (4) above, the variable r represents the radial distance from an origin in cylindrical coordinates (e.g., the r dimension). For example, the variable r can represent the distance from the central axis of a rotor. In the example of Equation (4) above, the variable T represents the temperature of the rotor at the radius r. In the example of Equation (4) above, the variable α represents the thermal diffusivity at the radius r as expressed in Equation (3). In the example of Equation (4) above, the operator $$\frac{\partial}{\partial r}$$

represents me partial derivative with respect to radius. In the example of Equation (2) above, $$\frac{\partial T}{\partial r}$$

represents the partial derivative of the temperature with respect to the radius. In the example of Equation (4) above, the $$\frac{\partial T}{\partial t}$$

represents the partial derivative of the temperature with respect to time.

In the example of FIG. 6, equation (2) is discretized and applied to a node via numerical methods such as finite different methods, wherein a calculated value of the temperature of backward and forward nodes (e.g., radially outer and radially inner nodes respectively) is available to the second logic calculation 600. For example, the second logic calculation 600 calculates backward and forward nodes with respect to the first node 148, the second node 150 (both of FIG. 1B), the N-1th node, etc.

In the example of FIG. 6, equation (4) is used for the radially innermost node of a rotor such as the rotor 222, which can be, for example, located at the central bore 144 or the central axis of the rotor 222, or the Nth node 152. Only a backward node (e.g., a radially outer node, the N-1th node, etc.) is available to the second logic calculation 600, leading to the modification of equation (2) that is equation (4).

In the illustrated example of FIG. 6, an example third dotted line 630 represents temperatures corresponding to the remainder of nodes (e.g., the nodes between the second node 150 and the $N^{th}$ node 152). For example, in the instance where N=10 nodes are selected, the third dotted line 630 would represent third, fourth, fifth, sixth, seventh, eighth, and ninth nodes located at respective third, fourth, fifth, sixth, seventh, eighth, and ninth radiuses.

In the example of FIG. 6, the second logic calculation 600 can be implemented in connection with a simulation, wherein the second logic calculation 600 is applied sequentially at steps in the time domain. Each step in the simulation is spaced apart the duration of the timestep 607, producing a discrete time simulation.

At an initializing point for a simulation utilizing the second logic calculation 600, it can be assumed that the temperature across the mesh of nodes is in a steady-state such that the reference temperature 610, the first temperature 624 at the first node 148, the second temperature 626 at the second node 150, the temperature at the $N^{th}$ node 152, and the temperatures of any intermediate nodes indicated by the third dotted line 630 are all the same. Thus, the only impetus for heat transfer in the mesh of nodes is assumed to be conduction based on the change of the reference temperature 610. In steady-state, the first, second, and third update blocks 612, 614, 616 receive constant temperature of the reference temperature 610. Thus, being that the reference temperature 610 is in steady-state, no temperature differential exists in the second logic calculation 600 and the first, second, and $N^{th}$ temperatures 624, 626, 628 and intermediate temperatures indicated by the third dotted line 630 remain the same. For example, the simulation can begin upon a departure from a steady-state temperature of the reference temperature 610.

In the illustrated example of FIG. 6, at each step in the simulation, the first temperature calculation block 618 calculates the first temperature 624 based on the reference, first, and second temperatures 610, 624, 626 at the previous step along with a thermal diffusivity determined by the thermal diffusivity polynomial coefficients 602, 603, 604, 605, 606, the timestep 607, the radius step 508, the radius of the first node 522, and the radiuses of intermediate nodes indicated by the second dotted line 608. First and second inputs 632, 634 indicate the inputs of the first and second temperatures 624, 626 along with the reference temperature 610 from the previous step into the first temperature calculation block 618. For instance, the temperatures in the simulation for a step can include one measured value, the reference temperature 610, and the remainder calculated values, the first, second, and Nth temperatures 624, 626, 628 and the intermediate temperatures indicated by the third dotted line 630.

Similarly, in the illustrated example of FIG. 6, the second temperature calculation block 620 calculates the second temperature 626 based on the first and second temperatures 624, 626 and a third temperature (not shown, indicated generally by the third dotted line 630) at the previous step along with a thermal diffusivity determined by the thermal diffusivity polynomial coefficients 602, 603, 604, 605, 606, the timestep 607, the radius step 508, the radius of the first node 522, and the radiuses of intermediate nodes indicated by the second dotted line 608. Third and fourth inputs 636, 638 indicate the inputs of the first and second temperatures 624, 626 to the second temperature calculation block 620. A fifth input 640 indicates the input of the temperature of a directly forward node to the second temperature calculation block 620. For instance, the fifth arrow 640 can indicate the input of the third temperature of the third node to the second temperature calculation block 620.

In the illustrated example of FIG. 6, the Nth temperature calculation block 622 calculates the Nth temperature 628 based on the Nth temperature 628 and an N-1th temperature (not shown, indicated generally by the third dotted line 630) at the previous step along with a thermal diffusivity determined by the thermal diffusivity polynomial coefficients 602, 603, 604, 605, 606, the timestep 607, the radius step 508, the radius of the first node 522, and the radiuses of intermediate nodes indicated by the second dotted line 608. A sixth input 642 represents the input of the N-1th temperature (not shown, generally indicated by the third dotted line 630) from the previous timestep. A seventh input 644 represents the input of the Nth temperature 628 at the previous timestep.

In the illustrated example of FIG. 6, the reference temperature 610 from the radially outermost node is updated for each step in the simulation to reflect the temperature of one of the first, second, and third thermocouples 242, 244, 246. The temperatures of each of the nodes radially inward from the reference node 146 are determined at each step based on the previously determined (e.g., from a previous step in the simulation) and/or currently calculated (e.g., from the current step in the simulation) temperature of the node itself, forward node(s), and/or backward node(s), with the exception of the temperature of the radially innermost node, the Nth temperature 628 of the Nth node 152. The Nth temperature 628 of the Nth node 152 is determined based on the previously determined and/or currently calculated temperature of the node itself and/or backward node(s). Thus, the change in the reference temperature 610 at least partially dictates the change in temperature for each of the inner nodes. The node temperature calculator 408 can populate the nodal temperature database 418 with calculated temperatures for nodes along with timestamps (e.g., timestamps corresponding with the elapsed timesteps or steps). For example, since the change in the reference temperature 610 is the impetus for conduction in the rotor, the node temperature calculator 408 can calculate the first temperature 624 first in a step and proceed to calculate the temperature of remainder of the radially inner nodes in the step moving radially inwards.

Figure 7:
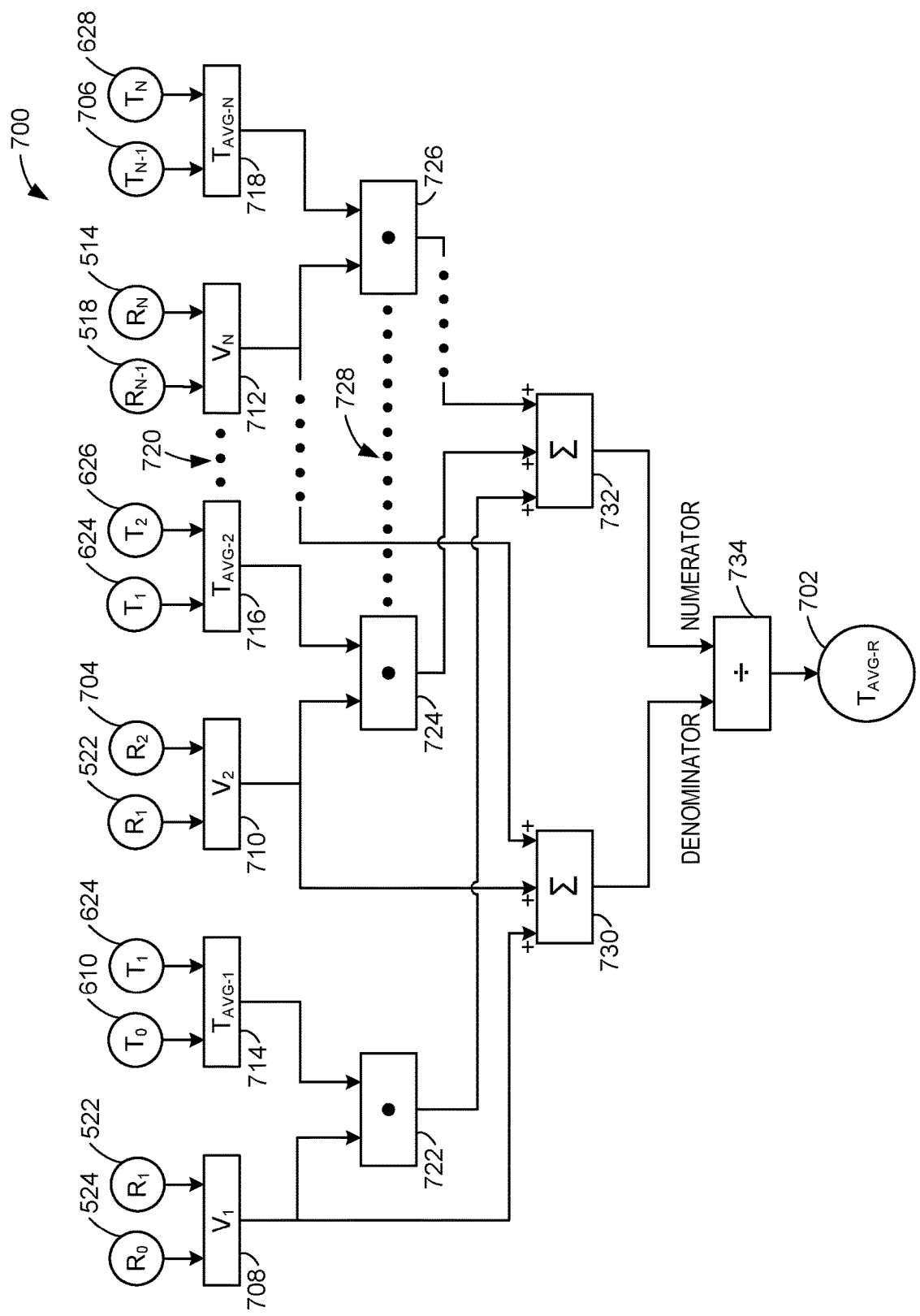
FIG. 7 is a schematic illustration of a logic determination that can be implemented by the example turbine parameter determiner of FIGS. 2 and/or 4 to determine an average temperature of a rotor of the example turbine of FIGS. 1A, 1B, and/or 2.

FIG. 7 is a schematic illustration of a third example logic calculation 700 that can be implemented by the turbine parameter determiner 240 of FIGS. 2 and/or 4 to determine the average temperature of a rotor (e.g., the first rotor 222, the second rotor 226, and/or the third rotor 230 of FIG. 2) based on a mesh of N nodes. For example, the rotor average temperature calculator 410 of FIG. 4 can execute the third logic calculation 700. In FIG. 7, the third logic calculation 700 can correspond to an example implementation of hardware logic, machine readable instructions, hardware implemented state machines, and/or any combination thereof that can be implemented and/or otherwise executed by the rotor average temperature calculator 410 and/or, more generally, the turbine parameter determiner 240.

In the illustrated example of FIG. 7, the rotor average temperature calculator 410 and/or, more generally, the turbine parameter determiner 240 implements and/or otherwise executes the third logic calculation 700 to determine an average rotor temperature 702 at each step of the simulation. In FIG. 7, the rotor average temperature calculator 410 can receive, import, and/or otherwise obtain, for a step, the radiuses of the reference, first, N-1th, and Nth nodes 524, 522, 518, 514 of the first logic calculation 500 of FIG. 5 along with a radius of the second node 704, calculated through intermediary calculations indicated by the first dotted line 521 (FIG. 5) of the first logic calculation 500. Further, the rotor average temperature calculator 410 can receive, import, and/or otherwise obtain, for a step, the reference, first, second, and Nth temperatures 610, 624, 626, 628 of the second logic calculation 600 of FIG. 6 along with a N-1th temperature 706, calculated through intermediary calculations indicated by the third dotted line 630 (FIG. 6) of the second logic calculation 600. For example, the rotor average temperature calculator 410 can obtain the temperatures from the nodal temperature database 418 or in any other suitable manner. For example, the rotor average temperature calculator 410 can obtain the radiuses of the nodes from the node radius calculator 406, from any local or external database or in any other suitable manner.

In the example of FIG. 7, first, second, and Nth volume calculation blocks 708, 710, 712 calculate area and/or volume of discs on a rotor such as the first rotor 222 of FIG. 2. In the example of FIG. 7, the first volume calculation block 708 calculates the volume of an outermost first disc (e.g., an annulus with an axial thickness, etc.) defined by the radius of the first node 522 (e.g., the first node 148 of FIG. 1B) and the radius of the reference node 524 (e.g., the reference node 146 of FIG. 1B). The second volume calculation block 710 calculates the volume of a second disc radially inward from the first disc defined by the radius of the second node 704 (e.g., the second node 150 of FIG. 1B) and the radius of the first node 522. The Nth volume calculation block 712 calculates the volume of an Nth disc radially inward from the second disc, though not necessarily directly so, defined by the radius of the Nth node 514 (e.g., the Nth node 152 of FIG. 1B) and the radius of the N-1th node 518. In some examples, there are subsequent volume calculation blocks between the second volume calculation block 710 and the Nth volume calculation block 712 such as a third volume calculation block defining a third disc, a fourth volume calculation block defining a fourth disc, a N-1th volume calculation block defining a N-1th disc, etc.

In the example of FIG. 7, first, second, and Nth temperature averaging blocks 714, 716, 718 calculate average temperatures of the discs corresponding to respective ones of the first, second, and Nth volume calculation blocks 708, 710, 712. In the example of FIG. 7, the first temperature averaging block 714 calculates the temperature of the first disc from the reference temperature 610 and the first temperature 624. The second temperature averaging block 716 calculates the temperature of the second disc from the first temperature 624 and the second temperature 626. The Nth temperature averaging block 718 calculates the temperature of the Nth disc from the N-1th temperature 706 and the Nth temperature 628. In some examples, there are subsequent temperature averaging blocks between the second temperature averaging block 716 and the Nth temperature averaging block 718 corresponding to the third volume calculation block defining the third disc, the fourth volume calculation block defining the fourth disc, the N-1th volume calculation block defining the N-1th disc, etc. In the example of FIG. 7, a fourth dotted line 720 indicates one or more subsequent pairs of volume calculation and temperature averaging blocks, each pair corresponding to an intermediate disc. In other examples, a different technique is used to aggregate the two temperatures of a disc (e.g., the reference and first temperatures 610, 624) other than taking the average of the two temperatures.

In the illustrated example of FIG. 7, first, second, and Nth multiplication blocks 722, 724, 726 multiply the volume of a disc (e.g., the respective outputs of first, second, and Nth volume calculation blocks 708, 710, 712) with the average temperature of the disc (e.g., the respective outputs of the first, second, and Nth temperature averaging blocks 714, 716, 718. The multiplication blocks 722, 724, 726 produce weighted temperature values for the first, second, and Nth discs respectively. For instance, there can be a plurality of multiplication blocks between the second multiplication block 724 and the Nth multiplication block 726 generally indicated by a fifth dotted line 728. For example, there can be a third multiplication block corresponding to the third disc, a fourth multiplication block corresponding to the fourth disc, a N-1th multiplication block corresponding to the N-1th disc, etc.

In the illustrated example of FIG. 7, a volume summation block 730 calculates the sum of the volumes and/or areas corresponding to the outputs of the first, second, and Nth volume calculation blocks 708, 710, 712 along with any intermediate volumes output by intermediate volume calculation blocks such as the third, fourth, N-1th, etc., volume calculation blocks indicated by the fourth dotted line 720. A weighted temperature summation block 732 takes the sum of the weighted temperatures corresponding to the outputs of the first, second, and Nth multiplication blocks 722, 724, 726 along with any intermediate weighted temperatures output by intermediate multiplication blocks such as the third, fourth, N-1th, etc., multiplication blocks generally indicated by the fifth dotted line 728. In the schematic illustration of FIG. 7, the volume and weighted temperature summation blocks 730, 732 each have three inputs corresponding to the first, second, and Nth discs and, more generally, the first, second, and Nth nodes (e.g., the first, second, and Nth nodes 148, 150, 152 of FIG. 1B). In an example implementation, there are N inputs to the volume and weighted temperature summation blocks 730, 732 corresponding to the N nodes.

In the illustrated example of FIG. 7, a second division block 734 divides the output of the weighted temperature summation block 732 (e.g., the numerator) by the output of the volume summation block 730 (e.g., the denominator). The output of the second division block 734 is the rotor average temperature 702 of the rotor (e.g., the first rotor 222, etc.) for a step of the simulation. For instance, this calculation or another method of calculating the average temperature of a rotor can be repeated at each step of the simulation as new temperature values are calculated by the second logic calculation 600.

In some examples, the thermal stress of a rotor is, in part, a function of the average temperature of the rotor (e.g., the average rotor temperature 702). Thus, in the illustrated examples of FIGS. 5, 6, and/or 7, after the node radius calculator 406 executes the first logic calculation 500 of FIG. 5, the node temperature calculator 408 executes the second logic calculation 600 of FIG. 6 for a step of a simulation, and the rotor average temperature calculator 410 executes the third logic calculation 700 of FIG. 7 for the step in the simulation, the thermal stress calculator 420 can calculate the thermal stress in the rotor according to the example of Equation (5) below:

$$\sigma_r = \frac{\alpha_{CTE} E}{1-v}(T_{avg} - T(r)) \quad \text{Equation (5)}$$

In the example of Equation (5) above, the variable a, represents the thermal stress values to be calculated for a rotor in a unit of pressure (e.g., Pascal, psi, etc.). The variable $\alpha_{CTE}$ is a first material parameter representative of the coefficient of thermal expansion of the material of the rotor, a parameter to be iteratively determined using the examples disclosed herein. The variable E is a second material parameter representative of the Young's modulus of the material of the rotor, a parameter to be iteratively determined using the methods disclosed herein. The variable v is a third material parameter representative of the Poisson's ratio of the material of the rotor, a parameter to be iteratively determined using the methods disclosed herein. Values for the aforementioned material parameters begin at baseline values (e.g., from the baseline value database 414). The variable $T_{avg}$ is the average rotor temperature 702 of FIG. 7. The variable T(r) represents the temperature at the position (e.g., the radius) on the rotor at which the thermal stress $\sigma_r$ is to be determined.

In some examples, the thermal stress calculator 420, in a first instance, substitutes the first temperature 624 corresponding to the first node 148 into Equation (5) for the variable T(r) to produce a thermal stress calculation at the first node 148. For example, the thermal stress calculator 420 can repeat this substitution instead replacing T(r) with the reference temperature 610 corresponding to the reference node 146, the second temperature 626 corresponding to the second node 150, and/or the Nth temperature 628 corresponding to the Nth node 152, calculating a thermal stress value (e.g., $\sigma_r$) in each instance. Further, the thermal stress calculator 420 can calculate the thermal stress by replacing T(r) with the temperature of nodes disposed between the second node 150 and the Nth node 152 such as the third node, fourth node, N-1th node, etc. The thermal stress calculator 420 can select the highest of the calculated thermal stress values for comparison with thermal stresses from the second OEM thermal stress database 416 calculated by the OEM thermal stress calculator 304 of FIG. 3A and store the selected thermal stress value in the simulation database 424 along with a timestamp corresponding to the timesteps elapsed. Additionally or alternatively, the thermal stress calculator 420 can store one or more of the calculated thermal stresses in the simulation database 424 along with a timestamp corresponding to the steps elapsed. The thermal stress calculator 420 can take the aforementioned steps to calculate and select thermal stress values for any number of steps considered by the aspects of the turbine parameter determiner 240.

In some examples, the thermal stress calculator 420 assembles a dataset (e.g., a Comma Separated Value (CSV) dataset, a SQL structure, etc.) including calculated thermal stresses and their corresponding timestamps and transmits the dataset to the simulation database 424. For example, the dataset can correspond (e.g., via timestamp) to a regiment of thermocouple measurements (e.g., from the thermocouple database 310) associated with a startup or shutdown procedure of the turbine 100 of FIGS. 1A, 1B, and/or 2.

Figure 8:
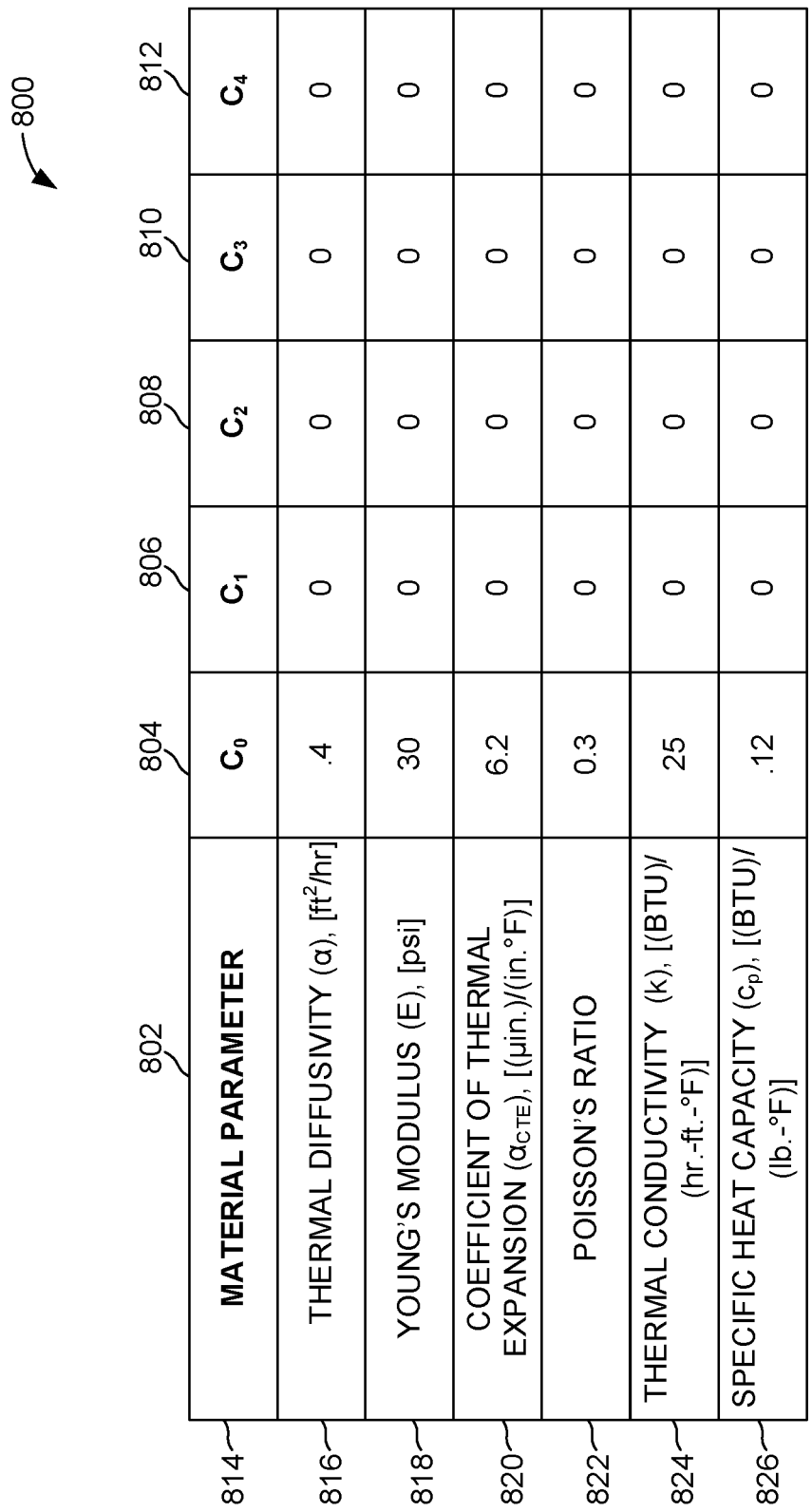
FIG. 8 is a table of example constants and/or coefficients representative of example material parameters that can be determined by the example turbine parameter determiner of FIGS. 2 and/or 4.

Now turning to FIG. 8, FIG. 8 is a table of example constants and/or coefficients representative of initializing values for material parameters (e.g., turbine parameters) and/or material parameter information that can be calculated by the turbine parameter determiner 240 of FIGS. 2 and/or 4. In FIG. 8, the reference value lookup 404 can look up (e.g., from the baseline value database 414) or generate the table 800. For example, the turbine parameter determiner 240 of FIG. 4 can iteratively improve the values of the table 800 by executing the instructions of FIGS. 9-10.

In the illustrated example of FIG. 8, the table 800 includes an example first column 802, an example second column 804, an example third column 806, an example fourth column 808, an example fifth column 810, and an example sixth column 812. In FIG. 8, the table 800 includes an example header row 814, an example first row 816, an example second row 818, an example third row 820, an example fourth row 822, and example fifth row 824, and an example sixth row 826. In FIG. 8, the table 800 includes example coefficients for temperature dependence described by the example of Equation (6) below:

$$\text{Material Parameter} = C_0 + C_1 T + C_2 T^2 + C_3 T^3 + C_4 T^4 \quad \text{Equation (6)}$$

In the example of Equation (6) above, the Material Parameter (e.g., the first column 802) represents the name of the material parameter to which Equation (6) is being applied to solve and/or otherwise generate a value. The variable T represents temperature. The variable $C_0$ (e.g., the second column 804) represents a constant term of the example of Equation (6) above. The variable $C_1$ (e.g., the third column 806) represents a first coefficient of the example of Equation (6) above. The variable $C_2$ (e.g., the fourth column 808) represents a second coefficient of the example of Equation (6) above. The variable $C_3$ (the fifth column 810) represents the third coefficient of the example of Equation (6) above. The variable $C_4$ (the sixth column 812) represents the fourth coefficient of the example of Equation (6) above. In other examples, any other polynomial degree of temperature dependence other than to the fourth power can be present (e.g., temperature dependence to the third power, fifth power, tenth power, etc.).

In the illustrated example of FIG. 8, the material parameters of the first column 802 are defined in English units. In other examples, equivalent SI units can be used. In some examples, final stress values calculated via equation (4) can have temperature dependence. In other examples, final stress values calculated via equation (5) do not have temperature dependence. However, the material parameter adjuster 412 and, more generally, the turbine parameter determiner 240 of FIG. 4, through comparison with OEM thermal stress, can add temperature dependence to the thermal diffusivity through iteration, for example, by executing the machine readable instructions in connection with FIGS. 9 and/or 10.

In the illustrated example of FIG. 8, the first row 816 includes example values for the variables of Equation (6) above to define the material parameter and/or to collectively define the material parameter information of thermal diffusivity ($\alpha$) in units of square feet per hour (ft$^2$/hr). In FIG. 8, the values of the first row 816 correspond to initializing thermal diffusivity values of coefficients $D_0$ 602, $D_1$ 603, $D_2$ 604, $D_3$ 605, $D_4$ 606 of FIG. 6.

In the illustrated example of FIG. 8, the second row 818 includes example values for the variables of Equation (6) above to define the material parameter of Young's modulus (E) in pounds per square inch (psi). Young's modulus is a direct input to the thermal stress calculation of the example of Equation (5) above.

In the illustrated example of FIG. 8, the third row 820 includes example values for the variables of Equation (6) above to define the material parameter of the coefficient of thermal expansion $\alpha_{CTE}$ in microinch per inch-degree Fahrenheit ($\mu$in/in.° F.). The coefficient of thermal expansion is a direct input to the thermal stress calculation of the example of Equation (5).

In the illustrated example of FIG. 8, the fourth row 822 includes example values for the variables of Equation (6) above to define the material parameter of Poisson's ratio, which is a dimensionless parameter. The Poisson's ratio is a direct input to the thermal stress calculation of the example of Equation (5).

In the illustrated example of FIG. 8, the fifth row 824 includes example values for the variables of Equation (6) above to define the material parameter of thermal conductivity (k) in BTUs per hour-feet-degree Fahrenheit (BTU/hr.ft. ° F.). Thermal conductivity (k) is a direct input to Equation (3).

In the illustrated example of FIG. 8, the sixth row 826 includes example values for the variables of Equation (6) above to define the material property of constant pressure specific heat capacity ($c_p$) in BTUs per pound-degree Fahrenheit (BTU/lb. ° F.). Constant pressure specific heat capacity ($c_p$) is a direct input to Equation (3). In FIG. 8, the example initializing values for the thermal diffusivity, Young's modulus, coefficient of thermal expansion, Poisson's ratio, thermal conductivity, and specific heat capacity have no temperature dependence. In other examples, the initializing values may have any degree of temperature dependence. Further, the material parameters of FIG. 8 can be redefined and/or otherwise adjusted by the material parameter adjuster 412 and, more generally, the turbine parameter determiner 240 of FIG. 4 to include any degree of temperature dependence during the course of a simulation, for example, by executing the machine readable instructions of FIGS. 9 and/or 10. In the example of FIG. 8, density is not included in the table 800 because it displays little to no temperature dependence. However, constant values for density can be iterated according to methods described herein.

In some examples, the reference value lookup 404 looks up first material parameter information (e.g., first values of the material parameter information of table 800 of FIG. 8 and/or a density value from the baseline value database 414 of FIG. 4). In some examples, the second thermal stress calculator 420 determines second thermal stress values based on one or more of the first and second temperature values (e.g., one or more of the reference temperature 610, the first temperature 624, the second temperature 626, and the Nth temperature 628 of FIG. 6) and the first material parameter information (e.g., first values of the material parameter information of table 800 of FIG. 8 and/or a density value). For example, the first material parameter information can be numerical values determined at radial nodes (e.g., the nodes 146, 148, 150, 152) at steps in a simulation. In some examples, the thermal stress comparator 422 calculates a difference between first thermal stress values (e.g., the thermal stress values calculated by the OEM thermal stress calculator 304 of FIG. 3A) and second thermal stress values (e.g., the thermal stress values calculated by the thermal stress calculator 420 of FIG. 4). In some examples, a material parameter adjuster 412, in response to determining the difference (e.g., the difference calculated by the thermal stress comparator 422 of FIG. 4) does not satisfy a threshold, determines material parameters (e.g., iterated values that satisfy the threshold of the material parameter information of the table 800 of FIG. 8 and/or a density value) by adjusting the first material parameter information (e.g., first values of the material parameter information of table 800 of FIG. 8 and/or a first density value from the baseline value database 414 of FIG. 4) to second material parameter information (e.g., second values of the material parameter information of table 800 of FIG. 8 and/or a second density value) based on the difference.

In FIG. 8, temperature independent reference values of the material parameter (e.g., a single constant $C_0$ of the second column 804) are used for initializing value for the simulation. Through the course of the simulation, the properties of the first column 802 are determined by material parameter adjuster 412 iteratively based on comparison between OEM stress values and calculated stress values.

Figure 9:
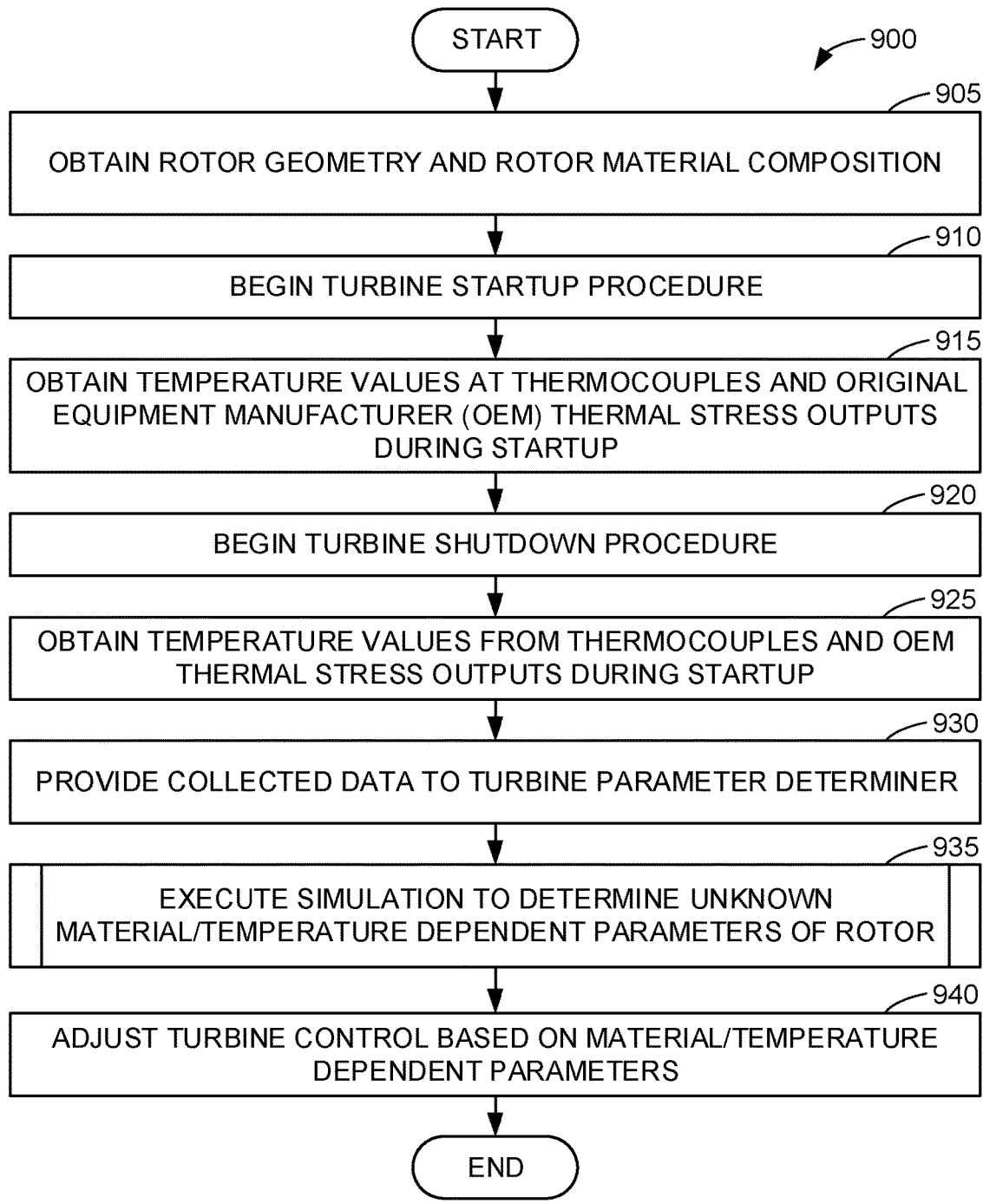
FIG. 9 is a flowchart representative of example machine readable instructions that can be executed to implement the example turbine measurement controller of FIGS. 2 and/or 3A and the example turbine parameter determiner of FIGS. 2 and/or 4 and to determine unknown material and/or temperature dependent parameters of a rotor of the example turbine of FIGS. 1A, 1B, and/or 2.

Flowcharts representative of example hardware logic, machine readable instructions, hardware implemented state machines, and/or any combination thereof for implementing the example turbine measurement controller 236 of FIG. 3A and/or the example turbine parameter determiner 240 of FIG. 4 are shown in FIGS. 3B, 9, and/or 10. The machine readable instructions may be one or more executable programs or portion(s) of an executable program for execution by a computer processor such as the processors 1112 and/or 1212 shown in the example processor platforms 1100 and/or 1200 discussed below in connection with FIGS. 11 and/or 12. The program may be embodied in software stored on a non-transitory computer readable storage medium such as a CD-ROM, a floppy disk, a hard drive, a DVD, a Blu-ray disk, or a memory associated with the processors 1112 and/or 1212 but the entire program and/or parts thereof could alternatively be executed by a device other than the processors 1112 and/or 1212 and/or embodied in firmware or dedicated hardware. Further, although the example program is described with reference to the flowchart illustrated in FIGS. 3B, 9, and/or 10, many other methods of implementing the example turbine measurement controller 236 of FIG. 3A and/or the example turbine parameter determiner 240 of FIG. 4 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), SQL, Swift, etc.

As mentioned above, the example processes of FIGS. 9 and/or 10 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 9 is a flowchart representative of example machine readable instructions 900 that can be executed by the turbine measurement controller 236 of FIG. 3A and/or the turbine parameter determiner 240 of FIG. 4 to determine unknown material and/or temperature dependent parameters (e.g., the parameters of table 800 of FIG. 8) of a rotor (e.g., the first rotor 222 of FIG. 2). The machine readable instructions 900 of FIG. 9 begin when the rotor geometry determiner 314 (FIG. 3A) determines the geometry, where available, of a rotor (e.g., the rotor 222) of a turbine and/or turbine stage (e.g., the high pressure stage 102 of FIG. 1A) upon which material parameters, parameters, and/or material parameter information (e.g., a function of temperature describing a material parameter) are to be determined. Additionally, the material composition determiner 306 (FIG. 3A) determines, where available, the material composition (e.g., the chemical composition) of the turbine rotor. (Block 905). For example, the determinations of the material composition determiner 306 and the rotor geometry determiner 314 can be communicated to the turbine parameter determiner 240 via the first network interface 308 and/or the network 238.

The turbine drive controller 234 of FIG. 2 can initiate and/or control a turbine startup procedure. (Block 910). For example, the turbine drive controller 234 can direct a governor to initiate a startup regiment based on an initial temperature of in a turbine (e.g., the turbine 100), for example, a cold, warm, or hot start corresponding to a relatively long, medium, and short duration startup (e.g., run-up of rotor speed) respectively. For example, for a cold start (e.g., a temperature below approximately 180° C.), the turbine startup may take as much as 24 hours to avoid excess thermal stress. During startup of a turbine, valves at the turbine (e.g., the turbine 100) and/or turbine stage inlet (e.g., the high pressure inlet 107) and the load condition on an electricity generator are carefully monitored and/or controlled such as to gradually increase the rotational speed of a turbine rotor (e.g., run-up).

During the course of the turbine startup, the thermocouple interface 302 (FIG. 3A) can measure, read, and/or otherwise obtain readings from, for example, the thermocouples 242, 244, 246 (FIG. 2) positioned at turbine stage inlets 107, 109, 112 (FIG. 1A) respectively along with associated timestamps. (Block 915). For example, the thermocouple interface 302 can provide the thermocouple readings and associated timestamps to the thermocouple database 310 of FIG. 3A. Further, at block 615, the OEM thermal stress calculator 304 (FIG. 3A) can calculate thermal stress values (e.g., black-box thermal stress computations) during the turbine startup and provide the thermal stress values and accompanying timestamps to the first OEM thermal stress database 312 (FIG. 3A) and/or the second OEM thermal stress database 416 (FIG. 4).

After the required data (e.g., thermocouple readings and OEM thermal stress calculations) is collected from a desired start-up procedure, the turbine drive controller 234 can actuate the turbine to operate for a period of time at a desired speed and load. Alternatively or subsequently, for example, the turbine drive controller 234 can direct a governor to execute a turbine shutdown procedure. In some examples, the turbine drive controller 234 can adjust operation of the turbine (e.g., the turbine 100) based on determined material parameters (e.g., material parameters determined by the turbine parameter determiner 240). (Block 920). During shutdown of a turbine, valves at a turbine and/or turbine stage inlet (e.g., the high pressure inlet 107) and the load condition on an electricity generator are carefully monitored and/or controlled such as to gradually decrease the rotational speed of a turbine rotor (e.g., run-down).

During the course of the turbine shutdown, the thermocouple interface 302 can measure, read, and/or otherwise obtain readings from, for example, the thermocouples 242, 244, 246 positioned at turbine stage inlets 107, 109, 112 respectively along with associated timestamps. (Block 925). For example, the thermocouple interface 302 can provide the thermocouple readings and associated timestamps to the thermocouple database 310 of FIG. 3A. Further, at block 615, the OEM thermal stress calculator 304 can calculate thermal stress values (e.g., black-box thermal stress computations) during the turbine shutdown and provide the thermal stress values and accompanying timestamps to the first OEM thermal stress database 312 and/or the second OEM thermal stress database 416.

In the illustrated example of FIG. 9, aspects of the turbine measurement controller 236 provide collected data and/or calculations to the turbine parameter determiner 240 of FIG. 4 via the first network interface 308, the network 238, and the second network interface 402. Additionally or alternatively, any other means can be used to communicate the collected data and/or calculations completed by aspects of the turbine measurement controller 236 to the turbine parameter determiner 240. (Block 930). For example, the thermocouple interface 302 can provide thermocouple readings and associated timestamps to the turbine parameter determiner 240. For example, the OEM thermal stress calculator 304 can provide OEM thermal stress calculations to the turbine parameter determiner 240. For example, the material composition determiner 306 can communicate determined material composition of a rotor to the turbine parameter determiner 240. For example, the rotor geometry determiner 314 can communicate determined geometry of a rotor to the turbine parameter determiner 240.

Figure 10:
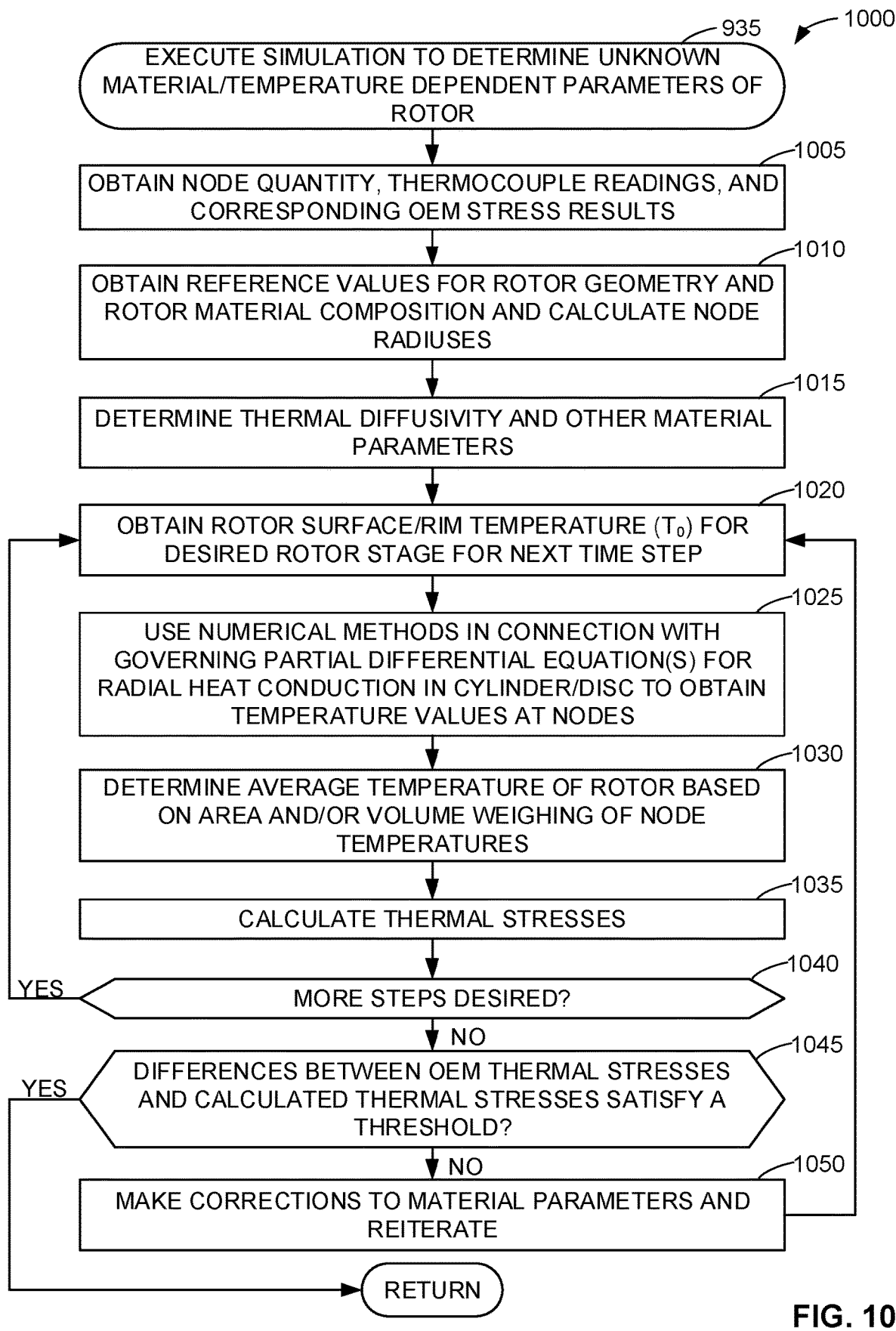
FIG. 10 is a flowchart of example machine readable instructions that can be executed to implement the example turbine parameter determiner of FIGS. 2 and/or 4 to execute a simulation to determine unknown material and/or temperature dependent parameters of turbine rotors of the example turbine of FIGS. 1A, 1B, and/or 2.

The turbine parameter determiner 240 can execute a simulation to determine the unknown material/temperature dependent parameters of the rotor, shown in further detail in connection with FIG. 10. (Block 935). The turbine parameter determiner 240 can transmit the determined material/temperature dependent parameters (e.g., transmit directly or indirectly) to the turbine measurement controller 236, the turbine drive controller 234, and/or the thermal stress controller 320 (e.g., the thermal stress controller 320 implemented by the turbine measurement controller 236 and the turbine drive controller 234) to adjust turbine control based on the material/temperature dependent parameters. (Block 940). For example, the turbine measurement controller 236, the turbine drive controller 234, and/or the thermal stress controller 320 can utilize the determined material/temperature dependent parameters to implement the logic calculations 500, 600, 700 and/or thermal stress calculations to trip the turbine (e.g., the turbine 100). After executing block 940, the machine readable instructions 900 of FIG. 9 conclude.

FIG. 10 is a flowchart of example machine readable instructions 1000 that can be executed to implement the turbine parameter determiner 240 of FIG. 4 to execute a simulation to determine unknown material and/or temperature dependent parameters (e.g., the parameters of table 800 of FIG. 8) of a rotor (e.g., the first rotor 222 of FIG. 2). The machine readable instructions 1000 of FIG. 10 can be executed to implement block 935 of FIG. 9. The machine readable instructions 1000 of FIG. 10 begin when the node radius calculator 406 (FIG. 4) obtains a desired quantity of nodes (e.g., the nodes 146, 148, 150, 152 of FIG. 1B) for use in the simulation. (Block 1005). For example, the node radius calculator 406 can be preprogrammed with a desired quantity of nodes, can receive communication specifying a desired quantity of nodes, can select an optimal quantity of nodes, or decide a desired quantity of nodes in any other suitable manner. In the example logic calculations 500, 600, 700 of FIGS. 5-7, N nodes are utilized in the simulation according to the convention of FIG. 1B.

Further, at block 1005, the thermocouple readings and OEM thermal stress calculations for the turbine startup and shutdown procedures are received from the turbine measurement controller 236 (FIG. 3A) via the second network interface 402 (FIG. 4). In the example of FIG. 10, the thermocouple readings and OEM thermal stress calculations for the turbine startup and shutdown procedures are received by the turbine parameter determiner 240 prior to execution of the machine readable instructions 1000 of FIG. 10 and are stored in the nodal temperature database 418 (FIG. 4) and the second OEM thermal stress database 416 (FIG. 4).

In the illustrated example of FIG. 10, the reference value lookup 404 (FIG. 4) obtains reference values for the rotor geometry and rotor material composition in the event no rotor geometry or insufficient rotor geometry is determined by the rotor geometry determiner 314 and/or no material composition is determined by the material composition determiner 306 of FIG. 3A. (Block 1010). For example, if none are available, the reference value lookup 404 can select the most appropriate rotor geometry and/or material composition from the baseline value database 414 (FIG. 4) based on available data. For example, the turbine and/or rotor manufacturer, operating parameters, and available rotor or material information can be used to select the most appropriate rotor geometry and material composition. In some examples, the default material composition is a steel Nickel- Chromium-Molybdenum-Vanadium (NiCrMoV) alloy, a common material used for manufacture of turbine rotors.

Further, at block 1010, the node radius calculator 406 can determine the radiuses of the nodes to form the mesh for the temperature calculations of FIGS. 7-8. The node radius calculator 406 can determine the radiuses (e.g., radial deviations from the center of a rotor) of the nodes (e.g., the nodes 146, 148, 150, 152 of FIG. 1B) according to the first logic calculation 500 of FIG. 5 utilizing the desired node quantity and rotor geometry.

In the illustrated example of FIG. 10, the reference value lookup 404 selects a generic (e.g. initializing) polynomial for thermal diffusivity (e.g. thermal diffusivity of table 800) based on the material composition of the turbine rotor from the baseline value database 414. (Block 1015). This polynomial for thermal diffusivity is iteratively improved over the course of the machine readable instructions 1000 of FIG. 10. Further, the reference value lookup 404 can select generic (e.g., initializing) values for the other material parameters of FIG. 8 (e.g., Young's modulus, coefficient of thermal expansion, Poisson's ratio, thermal conductivity, specific heat capacity) and/or density from the baseline value database 414 according to the determined or generic rotor material composition.

In the illustrated example of FIG. 10, the rotor average temperature calculator 410 can obtain the surface/rim temperature (e.g., the reference temperature 610 of FIG. 6) from the nodal temperature database 418 for steps on a time interval of the simulation. (Block 1020). For example, any appropriate timestep indicating the duration between steps can be utilized. In the example of FIG. 10, the step is selected according to the frequency of the thermocouple readings and OEM thermal stress values. For example, a timestep can be selected by the rotor average temperature calculator 410 that results in the lowest deviation between the timestamps of the utilized thermocouple readings and the timestamps of the utilized OEM thermal stress values within a reasonable frequency.

In the illustrated example of FIG. 10, the node temperature calculator 408 uses a numerical method in connection with the governing PDE(s) (e.g., Equations (2) and (4)) for radial heat conduction in a cylinder/disc to obtain temperature values at the determined nodes. (Block 1025). In the example of FIG. 10, the node temperature calculator 408 implements the second logic calculation 600 to calculate the temperature of internal nodes.

In the illustrated example of FIG. 10, the rotor average temperature calculator 410 determines the average temperature of the rotor based on volume and/or area weighing of the node temperatures. (Block 1030). In the example of FIG. 10, the rotor average temperature calculator 410 implements the third logic calculation 700 to calculate the average temperature of the rotor.

In the illustrated example of FIG. 10, the thermal stress calculator 420 calculates thermal stress in the rotor at the step according to Equation (5). (Block 1035).

In the illustrated example of FIG. 10, the turbine parameter determiner 240 determines if more steps are necessary for the calculation. (Block 1040). For example, if more thermocouple readings and OEM thermal stress values collected during a startup or shutdown procedure corresponding to the steps utilized are available (e.g., block 1040 returns YES), the machine readable instructions 1000 of FIG. 10 proceed to block 1020 to repeat blocks 1020-1040 for the subsequent step. In the event that no more steps/thermocouple readings collected during a startup and shutdown procedure (e.g., steps on the time interval of the simulation) are available (e.g., block 1040 returns NO), the machine readable instructions 1000 of FIG. 10 proceed to block 1045.

In the illustrated example of FIG. 10, once a dataset of thermal stress values has been calculated for the interval of the startup and/or shutdown procedures, the thermal stress comparator 422 determines if the difference (e.g., the absolute difference) between the OEM thermal stress and the thermal stress calculated by the thermal stress calculator 420 satisfied a threshold. (Block 1045). In the example of FIG. 10, any suitable difference threshold can be used that ensures similarity between the OEM thermal stress and the thermal stress calculated by the thermal stress calculator 420. In the event that the difference does satisfy the threshold (e.g., block 1045 returns YES), the output handler 413 provides the most recently iterated material parameters and/or material parameter information (e.g., a function of temperature describing a material parameter) to an appropriate entity (e.g., a user, a process control system, etc.) and the machine readable instructions 1000 of FIG. 10 end and control returns to the machine readable instructions 900 of FIG. 9 to end. In the event the difference does not satisfy the threshold (e.g., the block 1045 returns NO), the machine readable instructions 1000 of FIG. 10 proceed to block 1050.

In the illustrated example of FIG. 10, the material parameter adjuster 412 makes corrections to the material parameters and repeats the simulation from block 1020. (Block 1050). For example, the material parameter adjuster 412 can adjust the material parameters relatively upward or downward to account for the difference between the OEM thermal stress and the thermal stress calculated by the thermal stress calculator 420. Advantageously, the material parameter adjuster 412 can improve the operating lifetime of the turbine 100 by iteratively improving material parameters for input into a process control system, therefore allowing for integrated thermal stress determinations and diagnostics.

Figure 11:
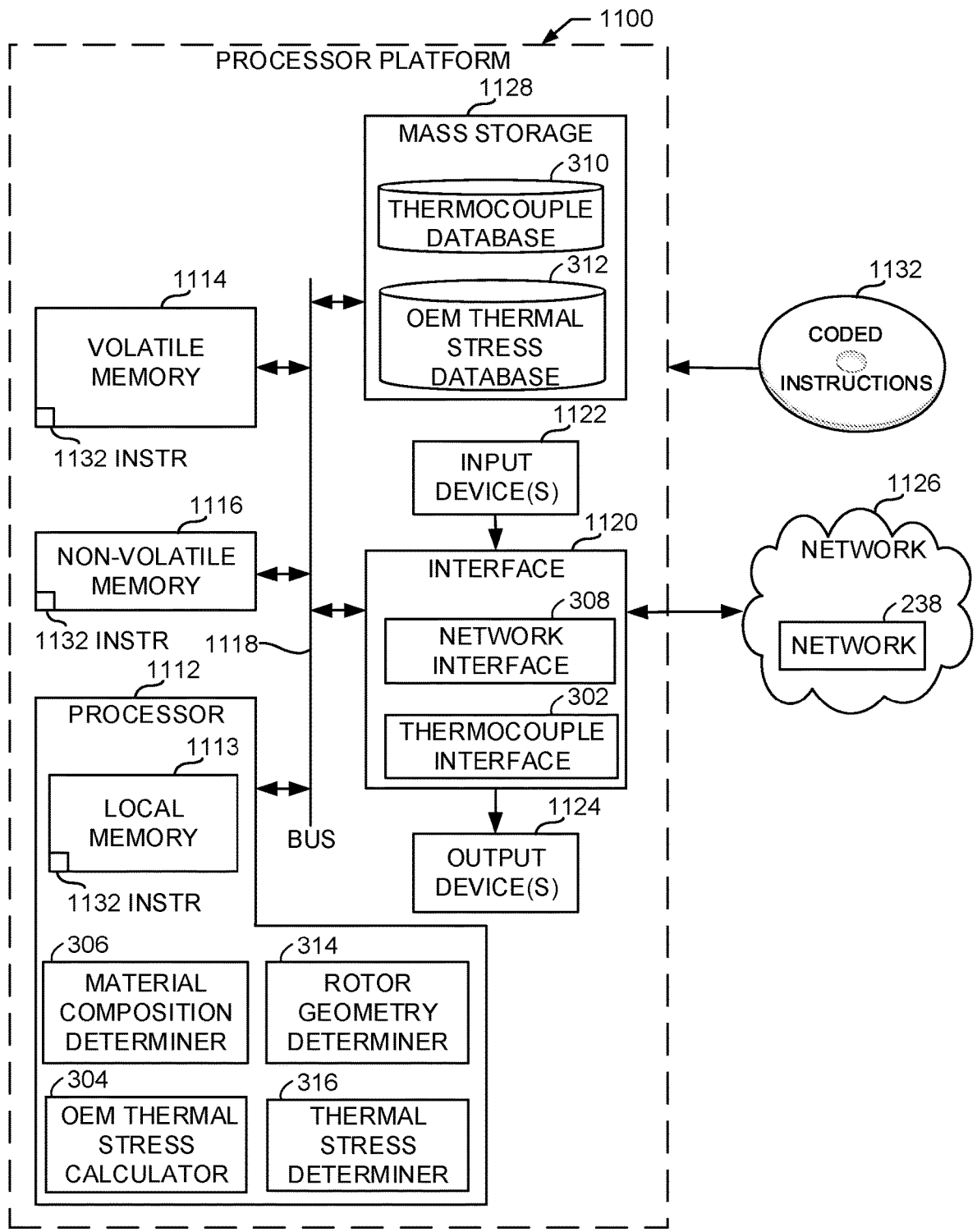
FIG. 11 is a block diagram of an example processing platform structured to execute the example machine readable instructions of FIGS. 9 and/or 10 to implement the example turbine measurement controller of FIGS. 2 and/or 3A.

FIG. 11 is a block diagram of an example processor platform 1100 structured to execute the instructions of FIG. 9 to implement the apparatus of FIG. 3A. The processor platform 1100 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1100 of the illustrated example includes a processor 1112. The processor 1112 of the illustrated example is hardware. For example, the processor 1112 can be implemented by one or more integrated circuits, logic circuits, microprocessors, GPUs, DSPs, or controllers from any desired family or manufacturer. The hardware processor may be a semiconductor based (e.g., silicon based) device. In the example of FIG. 11, the processor 1112 implements the OEM thermal stress calculator 304, the material composition determiner 306, the rotor geometry determiner 314, and the thermal stress determiner 316.

The processor 1112 of the illustrated example includes a local memory 1113 (e.g., a cache). The processor 1112 of the illustrated example is in communication with a main memory including a volatile memory 1114 and a non-volatile memory 1116 via a bus 1118. The volatile memory 1114 may be implemented by SDRAM, DRAM, RDRAM® and/or any other type of random access memory device. The non-volatile memory 1116 may be implemented by flash memory and/or any other desired type of memory device. Access to the main memory 1114, 1116 is controlled by a memory controller.

The processor platform 1100 of the illustrated example also includes an interface circuit 1120. The interface circuit 1120 may be implemented by any type of interface standard, such as an Ethernet interface, a universal serial bus (USB), a Bluetooth® interface, a near field communication (NFC) interface, and/or a PCI express interface. In the example of FIG. 11, the interface circuit 1120 implements the thermocouple interface 302 and the first network interface 308 of FIG. 3A.

In the illustrated example, one or more input devices 1122 are connected to the interface circuit 1120. The input device(s) 1122 permit(s) a user to enter data and/or commands into the processor 1112. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1124 are also connected to the interface circuit 1120 of the illustrated example. The output devices 1124 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1120 of the illustrated example, thus, typically includes a graphics driver card, a graphics driver chip and/or a graphics driver processor.

The interface circuit 1120 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1126. The communication can be via, for example, an Ethernet connection, a digital subscriber line (DSL) connection, a telephone line connection, a coaxial cable system, a satellite system, a line-of-site wireless system, a cellular telephone system, etc. In the example of FIG. 11, the network 1126 implements the network 238 of FIG. 2.

The processor platform 1100 of the illustrated example also includes one or more mass storage devices 1128 for storing software and/or data. Examples of such mass storage devices 1128 include floppy disk drives, hard drive disks, compact disk drives, Blu-ray disk drives, redundant array of independent disks (RAID) systems, and DVD drives. In the example of FIG. 11, the one or more mass storage devices 1128 implement the thermocouple database 310 and the first OEM thermal stress database 312.

The machine executable instructions 1132 of FIG. 9 may be stored in the mass storage device 1128, in the volatile memory 1114, in the non-volatile memory 1116, and/or on a removable non-transitory computer readable storage medium such as a CD or DVD.

Figure 12:
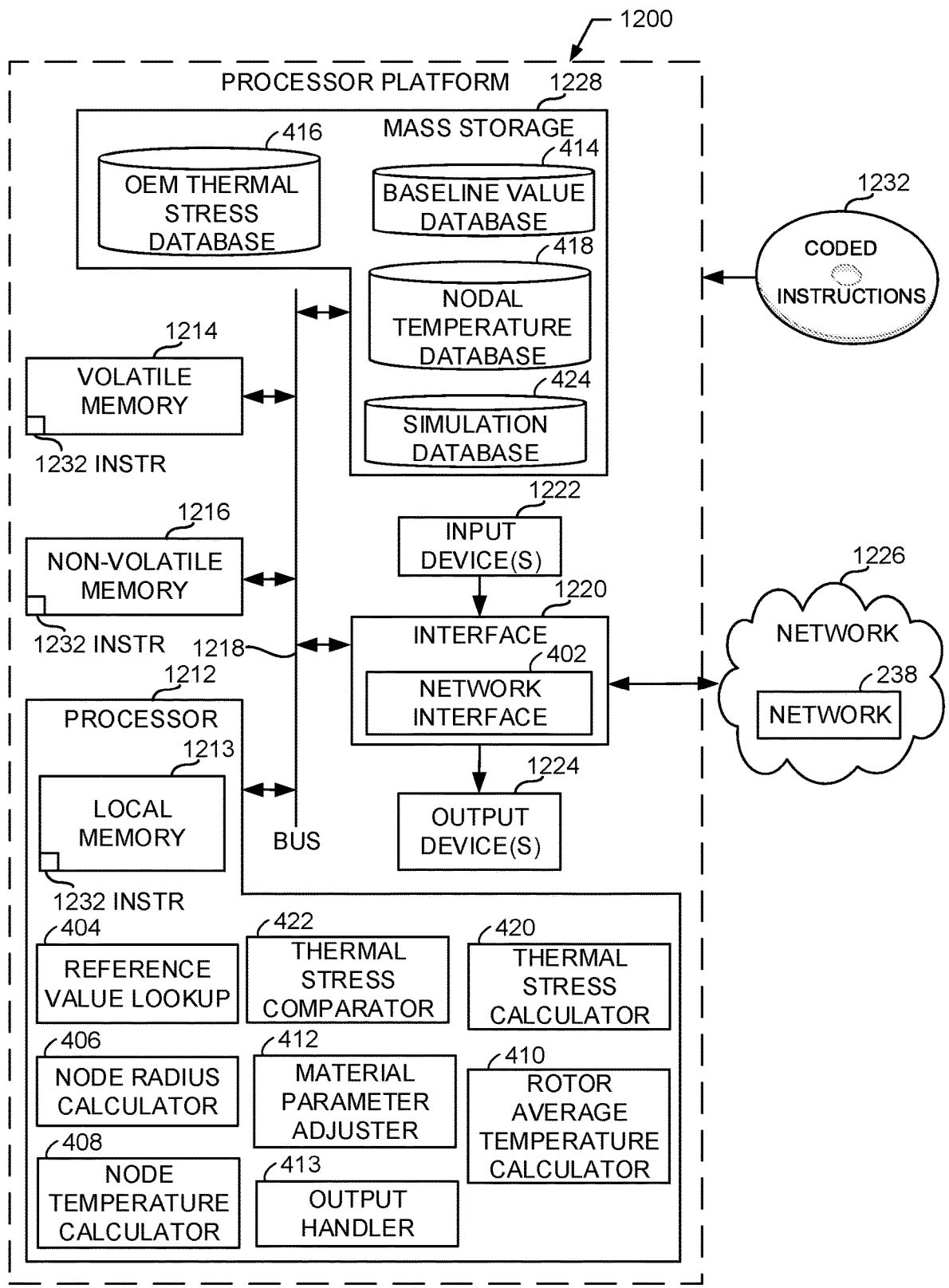
FIG. 12 is a block diagram of an example processing platform structured to execute the example machine readable instructions of FIG. 10 to implement the example turbine parameter determiner of FIGS. 2 and/or 4.

FIG. 12 is a block diagram of an example processor platform 1200 structured to execute the instructions of FIGS. 9 and/or 10 to implement the apparatus of FIG. 4. The processor platform 1200 can be, for example, a server, a personal computer, a workstation, a self-learning machine (e.g., a neural network), a mobile device (e.g., a cell phone, a smart phone, a tablet such as an iPad™), a PDA, an Internet appliance, a DVD player, a CD player, a digital video recorder, a Blu-ray player, a gaming console, a personal video recorder, a set top box, a headset or other wearable device, or any other type of computing device.

The processor platform 1200 of the illustrated example includes a processor 1212. The processor 1212 of the illustrated example is hardware. For example, the processor 1212 can be implemented by one or more integrated circuits, logic circuits, microprocessors, GPUs, DSPs, or controllers from any desired family or manufacturer. The hardware processor may be a semiconductor based (e.g., silicon based) device. In the example of FIG. 12, the processor 1212 implements the reference value lookup 404, the node radius calculator 406, the node temperature calculator 408, the rotor average temperature calculator 410, the material parameter adjuster 412, the output handler 413, the thermal stress calculator 420, and the thermal stress comparator 422 of FIG. 4.

The processor 1212 of the illustrated example includes a local memory 1213 (e.g., a cache). The processor 1212 of the illustrated example is in communication with a main memory including a volatile memory 1214 and a non-volatile memory 1216 via a bus 1218. The volatile memory 1214 may be implemented by SDRAM, DRAM, RDRAM® and/or any other type of random access memory device. The non-volatile memory 1216 may be implemented by flash memory and/or any other desired type of memory device. Access to the main memory 1214, 1216 is controlled by a memory controller.

The processor platform 1200 of the illustrated example also includes an interface circuit 1220. The interface circuit 1220 may be implemented by any type of interface standard, such as an Ethernet interface, a universal serial bus (USB), a Bluetooth® interface, a near field communication (NFC) interface, and/or a PCI express interface. In the example of FIG. 12, the interface circuit 1220 implements the second network interface 402 of FIG. 4.

In the illustrated example, one or more input devices 1222 are connected to the interface circuit 1220. The input device(s) 1222 permit(s) a user to enter data and/or commands into the processor 1212. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1224 are also connected to the interface circuit 1220 of the illustrated example. The output devices 1224 can be implemented, for example, by display devices (e.g., a LED, an OLED, a LCD, a CRT, an IPS display, a touchscreen, etc.), a tactile output device, a printer and/or speaker. The interface circuit 1220 of the illustrated example, thus, typically includes a graphics driver card, a graphics driver chip and/or a graphics driver processor.

The interface circuit 1220 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1226. The communication can be via, for example, an Ethernet connection, a DSL connection, a telephone line connection, a coaxial cable system, a satellite system, a line-of-site wireless system, a cellular telephone system, etc. In the example of FIG. 12, the network 1226 also implements the network 238 of FIG. 2.

The processor platform 1200 of the illustrated example also includes one or more mass storage devices 1228 for storing software and/or data. Examples of such mass storage devices 1228 include floppy disk drives, hard drive disks, compact disk drives, Blu-ray disk drives, RAID systems, and DVD drives. In the example of FIG. 12, the one or more mass storage devices 1228 implement the baseline value database 414, the second OEM thermal stress database 416, the nodal temperature database 418, and the simulation database 424 of FIG. 4.

The machine executable instructions 1232 of FIGS. 9 and/or 10 may be stored in the mass storage device 1228, in the volatile memory 1214, in the non-volatile memory 1216, and/or on a removable non-transitory computer readable storage medium such as a CD or DVD.

From the foregoing, it will be appreciated that example methods, apparatus and articles of manufacture have been disclosed that determine material parameters of rotors. The disclosed methods, apparatus and articles of manufacture improve the efficiency of using a computing device by iteratively comparing calculated thermal stress on an interval to OEM thermal stress on the interval to generate accurate material parameters of a turbine rotor. The disclosed methods, apparatus and articles of manufacture are accordingly directed to one or more improvement(s) in the functioning of a computer.

Example 1 includes an apparatus to determine material parameters of a turbine rotor, the apparatus comprising, a rotor geometry determiner to determine a geometry of the turbine rotor of a turbine, a node radius calculator to calculate radial node locations of radial nodes on the turbine rotor, the radial nodes including a first radial node corresponding to an outermost node of the radial nodes, a thermocouple interface to record first temperature values over a time interval, a first thermal stress calculator to calculate first thermal stress values at one or more of the radial nodes over the time interval, a node temperature calculator to calculate second temperature values at respective internal nodes of the first radial node, a reference value lookup to lookup first material parameter information, a second thermal stress calculator to determine second thermal stress values based on one or more of the first and second temperature values and the first material parameter information, a thermal stress comparator to calculate a difference between the first thermal stress values and the second thermal stress values, and in response to determining that the difference does not satisfy a threshold, a material parameter adjuster to determine material parameters by adjusting the first material parameter information to second material parameter information based on the difference.

Example 2 includes the apparatus of example 1, wherein the material parameters include at least one of Young's modulus, Poisson's ratio, coefficient of thermal expansion, thermal diffusivity, thermal conductivity, specific heat capacity, or density.

Example 3 includes the apparatus of example 1, wherein the time interval corresponds to at least a portion of at least one of a startup procedure or a shutdown procedure of the turbine rotor.

Example 4 includes the apparatus of example 1, wherein the thermocouple interface is to obtain the first temperature values at the first radial node from a thermocouple at an inlet of a stage of the turbine.

Example 5 includes the apparatus of example 1, wherein the radial nodes include a second radial node radially inward from the first radial node defining a first distance therebetween, a third radial node radially inward from the second radial node, and a fourth radial node radially inward from the third radial node defining a second distance therebetween, the first distance less than the second distance.

Example 6 includes the apparatus of example 1, wherein the turbine rotor is a low pressure, an intermediate pressure, or a high pressure turbine rotor associated with the turbine.

Example 7 includes the apparatus of example 1, further including a turbine drive controller to adjust operation of the turbine based on the determined material parameters.

Example 8 includes a non-transitory computer readable medium comprising instructions that, when executed, cause at least one processor to at least determine a geometry of a turbine rotor of a turbine, select radial nodes of the turbine rotor, the radial nodes including a first radial node corresponding to an outermost node of the radial nodes, record (i) first temperature values at the first radial node over a time interval and (ii) first thermal stress values at the radial nodes over the time interval, and generate, by executing an instruction with at least one processor, adjusted material parameters by simulating steps in the time interval including to determine second temperature values at respective internal nodes of the first radial node, determine values for the material parameters at the respective radial nodes at the steps, determine second thermal stress values based on the first and second temperature values and the values for the material parameters, calculate a difference between the first thermal stress values and the second thermal stress values, and in response to determining that the difference does not satisfy a threshold, adjust the material parameters based on the difference.

Example 9 includes the non-transitory computer readable medium of example 8, wherein the material parameters include at least one of Young's modulus, Poisson's ratio, coefficient of thermal expansion, thermal diffusivity, thermal conductivity, specific heat capacity, or density.

Example 10 includes the non-transitory computer readable medium of example 8, wherein the time interval corresponds to at least a portion of at least one of a startup procedure or a shutdown procedure of the turbine rotor.

Example 11 includes the non-transitory computer readable medium of example 8, wherein the instructions, when executed, cause the at least one processor to obtain the first temperature values at the first radial node from a thermocouple at an inlet of a stage of the turbine.

Example 12 includes the non-transitory computer readable medium of example 8, wherein the radial nodes include a second radial node radially inward from the first radial node defining a first distance therebetween, a third radial node radially inward from the second radial node, and a fourth radial node radially inward from the third radial node defining a second distance therebetween, the first distance less than the second distance.

Example 13 includes the non-transitory computer readable medium of example 8, wherein the instructions, when executed, cause the at least one processor to adjust operation of the turbine based on the adjusted material parameters.

Example 14 includes a method for determining material parameters of a turbine rotor, the method comprising determining a geometry of the turbine rotor of a turbine, selecting radial nodes of the turbine rotor, the radial nodes including a first radial node corresponding to an outermost node of the radial nodes, recording (i) first temperature values at the first radial node over a time interval and (ii) first thermal stress values at the radial nodes over the time interval, and generating, by executing an instruction with at least one processor, adjusted material parameters by simulating steps in the time interval by determining second temperature values at respective internal nodes of the first radial node, determining values for the material parameters at the respective radial nodes at the steps, determining second thermal stress values based on the first and second temperature values and the values for the material parameters, calculating a difference between the first thermal stress values and the second thermal stress values, and in response to determining that the difference does not satisfy a threshold, adjusting the material parameters based on the difference.

Example 15 includes the method of example 14, wherein the material parameters include at least one of Young's modulus, Poisson's ratio, coefficient of thermal expansion, thermal diffusivity, thermal conductivity, specific heat capacity, or density.

Example 16 includes the method of example 15, wherein the material parameters are a function of temperature.

Example 17 includes the method of example 14, wherein the time interval corresponds to at least a portion of at least one of a startup procedure or a shutdown procedure of the turbine rotor.

Example 18 includes the method of example 14, further including obtaining the first temperature values at the first radial node from a thermocouple at an inlet of a stage of the turbine.

Example 19 includes the method of example 14, wherein the radial nodes include a second radial node radially inward from the first radial node defining a first distance therebetween, a third radial node radially inward from the second radial node, and a fourth radial node radially inward from the third radial node defining a second distance therebetween, the first distance less than the second distance.

Example 20 includes the method of example 14, wherein the turbine rotor is a low pressure, an intermediate pressure, or a high pressure turbine rotor associated with the turbine.

Example 21 includes the method of example 14, further including adjusting operation of the turbine based on the adjusted material parameters.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus to determine material parameters of a turbine rotor, the apparatus comprising:
   a rotor geometry determiner to determine a geometry of the turbine rotor of a turbine;
   a node radius calculator to calculate radial node locations of radial nodes on the turbine rotor, the radial nodes including a first radial node corresponding to an outermost node of the radial nodes;
   a thermocouple interface to record first temperature values over a time interval;
   a first thermal stress calculator to calculate first thermal stress values at one or more of the radial nodes over the time interval;
   a node temperature calculator to calculate second temperature values at respective internal nodes of the first radial node;
   a reference value lookup to lookup first material parameter information;
   a second thermal stress calculator to determine second thermal stress values based on one or more of the first and second temperature values and the first material parameter information;
   a thermal stress comparator to calculate a difference between the first thermal stress values and the second thermal stress values; and
   in response to determining that the difference does not satisfy a threshold, a material parameter adjuster to determine material parameters by adjusting the first material parameter information to second material parameter information based on the difference.

2. The apparatus of claim 1, wherein the material parameters include at least one of Young's modulus, Poisson's ratio, coefficient of thermal expansion, thermal diffusivity, thermal conductivity, specific heat capacity, or density.

3. The apparatus of claim 1, wherein the time interval corresponds to at least a portion of at least one of a startup procedure or a shutdown procedure of the turbine rotor.

4. The apparatus of claim 1, wherein the thermocouple interface is to obtain the first temperature values at the first radial node from a thermocouple at an inlet of a stage of the turbine.

5. The apparatus of claim 1, wherein the radial nodes include a second radial node radially inward from the first radial node defining a first distance therebetween, a third radial node radially inward from the second radial node, and a fourth radial node radially inward from the third radial node defining a second distance therebetween, the first distance less than the second distance.

6. The apparatus of claim 1, wherein the turbine rotor is a low pressure, an intermediate pressure, or a high pressure turbine rotor associated with the turbine.

7. The apparatus of claim 1, further including a turbine drive controller to adjust operation of the turbine based on the determined material parameters.

8. A non-transitory computer readable medium comprising instructions that, when executed, cause at least one processor to at least:
   determine a geometry of a turbine rotor of a turbine;
   select radial nodes of the turbine rotor, the radial nodes including a first radial node corresponding to an outermost node of the radial nodes;
   record (i) first temperature values at the first radial node over a time interval and (ii) first thermal stress values at the radial nodes over the time interval; and
   generate, by executing an instruction with at least one processor, adjusted material parameters by simulating steps in the time interval including to:
   determine second temperature values at respective internal nodes of the first radial node;
   determine values for the material parameters at the respective radial nodes at the steps;
   determine second thermal stress values based on the first and second temperature values and the values for the material parameters;
   calculate a difference between the first thermal stress values and the second thermal stress values; and
   in response to determining that the difference does not satisfy a threshold, adjust the material parameters based on the difference.

9. The non-transitory computer readable medium of claim 8, wherein the material parameters include at least one of Young's modulus, Poisson's ratio, coefficient of thermal expansion, thermal diffusivity, thermal conductivity, specific heat capacity, or density.

10. The non-transitory computer readable medium of claim 8, wherein the time interval corresponds to at least a portion of at least one of a start-up procedure or a shutdown procedure of the turbine rotor.

11. The non-transitory computer readable medium of claim 8, wherein the instructions, when executed, cause the at least one processor to obtain the first temperature values at the first radial node from a thermocouple at an inlet of a stage of the turbine.

12. The non-transitory computer readable medium of claim 8, wherein the radial nodes include a second radial node radially inward from the first radial node defining a first distance therebetween, a third radial node radially inward from the second radial node, and a fourth radial node radially inward from the third radial node defining a second distance therebetween, the first distance less than the second distance.

13. The non-transitory computer readable medium of claim 8, wherein the instructions, when executed, cause the at least one processor to adjust operation of the turbine based on the adjusted material parameters.

14. A method for determining material parameters of a turbine rotor, the method comprising:
    determining a geometry of the turbine rotor of a turbine;
    selecting radial nodes of the turbine rotor, the radial nodes including a first radial node corresponding to an outermost node of the radial nodes;
    recording (i) first temperature values at the first radial node over a time interval and (ii) first thermal stress values at the radial nodes over the time interval; and
    generating, by executing an instruction with at least one processor, adjusted material parameters by simulating steps in the time interval by:
        determining second temperature values at respective internal nodes of the first radial node;
        determining values for the material parameters at the respective radial nodes at the steps;
        determining second thermal stress values based on the first and second temperature values and the values for the material parameters;
        calculating a difference between the first thermal stress values and the second thermal stress values; and
        in response to determining that the difference does not satisfy a threshold, adjusting the material parameters based on the difference.

15. The method of claim 14, wherein the material parameters include at least one of Young's modulus, Poisson's ratio, coefficient of thermal expansion, thermal diffusivity, thermal conductivity, specific heat capacity, or density.

16. The method of claim 15, wherein the material parameters are a function of temperature.

17. The method of claim 14, wherein the time interval corresponds to at least a portion of at least one of a startup procedure or a shutdown procedure of the turbine rotor.

18. The method of claim 14, further including obtaining the first temperature values at the first radial node from a thermocouple at an inlet of a stage of the turbine.

19. The method of claim 14, wherein the radial nodes include a second radial node radially inward from the first radial node defining a first distance therebetween, a third radial node radially inward from the second radial node, and a fourth radial node radially inward from the third radial node defining a second distance therebetween, the first distance less than the second distance.

20. The method of claim 14, wherein the turbine rotor is a low pressure, an intermediate pressure, or a high pressure turbine rotor associated with the turbine.

21. The method of claim 14, further including adjusting operation of the turbine based on the adjusted material parameters.

* * * * *